(12) United States Patent
Mueller et al.

(10) Patent No.: US 7,547,886 B2
(45) Date of Patent: Jun. 16, 2009

(54) INFRARED SENSOR SYSTEMS AND DEVICES

(75) Inventors: Michael Mueller, Alameda, CA (US); Jim Cheng, Berkeley, CA (US); Albert Pisano, Danville, CA (US); Thomas H. Cauley, III, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 174 days.

(21) Appl. No.: 11/483,142

(22) Filed: Jul. 7, 2006

(65) Prior Publication Data

US 2007/0108384 A1 May 17, 2007

Related U.S. Application Data

(60) Provisional application No. 60/697,741, filed on Jul. 7, 2005.

(51) Int. Cl.
*G01J 5/00* (2006.01)
(52) U.S. Cl. .................................. 250/338.1
(58) Field of Classification Search ... 250/338.1–338.5; 73/1.15, 760, 781, 795, 720
See application file for complete search history.

(56) References Cited

U.S. PATENT DOCUMENTS

| | | | |
|---|---|---|---|
| 4,937,550 A | | 6/1990 | Tawada et al. |
| 5,182,624 A | * | 1/1993 | Tran et al. ................ 257/40 |
| 5,389,788 A | * | 2/1995 | Grinberg et al. ........... 250/331 |
| 5,488,226 A | * | 1/1996 | Iafrate et al. ............. 250/338.4 |
| 5,512,750 A | * | 4/1996 | Yanka et al. ............. 250/338.4 |
| 5,585,646 A | | 12/1996 | Kossovsky et al. |
| 5,696,377 A | * | 12/1997 | Kanzaki ................ 250/338.4 |
| 5,794,889 A | * | 8/1998 | Bailey ................... 244/136 |
| 5,891,581 A | * | 4/1999 | Simpson et al. ........... 428/458 |
| 5,917,226 A | * | 6/1999 | Chan et al. ............... 257/415 |
| 6,739,199 B1 | | 5/2004 | Nikkel |
| 2004/0007076 A1 | | 1/2004 | Riddering et al. |

(Continued)

FOREIGN PATENT DOCUMENTS

JP 07330809 A * 12/1995

(Continued)

OTHER PUBLICATIONS

R. Kumar, "A review of chitin and chitosan applications", Nov. 2000, Reactive and Functional Polymers, vol. 46, No. 1, pp. 1-27.*

(Continued)

*Primary Examiner*—David P Porta
*Assistant Examiner*—Kiho Kim
(74) *Attorney, Agent, or Firm*—John P. O'Banion

(57) ABSTRACT

An organic material can be used in a modified strain gauge for IR transduction, resulting in an organic IR sensor. Infrared radiation incident on the organic material modulates a displacement of the material in order to detect the presence and intensity of IR radiation. This innovative design doesn't require cooling, and is sensitive to 9 and 3 μm—wavelengths that are emitted by mammals and forest fires, respectively. In addition, a photomechanical polymer can be used in a transistor based on a thin-film transistor (TFT), also resulting in an IR sensor. Through careful synthesis of the polymers, the photomechanical response of the transistor can be tailored to certain IR bands for detection purposes.

7 Claims, 20 Drawing Sheets

U.S. PATENT DOCUMENTS

2005/0110091 A1    5/2005  Yamazaki et al.
2005/0130360 A1*   6/2005  Zhan et al. .................. 438/197

OTHER PUBLICATIONS

Hautamaki et al., "Experimental Evaluation of MEMS Strain Sensors Embedded in Composites", 1999 IEEE, Journal of Microelectromechanical Systems, vol. 8, No. 3, pp. 272-279.*

A.L. Andrady et al. Elastic Behavior of Chitosan Films. J. Polym. Sci. Part B: Polymer Physics, vol. 35, pp. 517-521 (1997).

H. Bleckmann et al. Nature as a model for technical sensors. J. Comp. Physiol. A, vol. 190, pp. 971-981 (2004).

A.L. Campbell et al. Biological infrared imaging and sensing. Micron, vol. 33, pp. 211-225 (2002).

G. Cardenas et al. Chitan chracterization by SEM, FTIR, XRD, and 13C Cross Polarization/Mass Angle Spinning NMR. J. Appl. Polym. Sci., vol. 93, pp. 1876-1885 (2004).

Dalwoo Corp. Spectra of chitan/chitosan. http://members.tripod.com/~Dalwoo/spectra.htm. Apr. 1999.

P.G. Datskos et al. Performance of uncooled microcantilever thermal detectors. Review of Scientific Instruments, vol. 75, pp. 1134-1148 (2004).

M.H. Dickinson. Bionics: Biological insight into mechanical design. PNAS, vol. 96 (1999).

C.D. Dimitrakopoulos et al. Organic thin-film transistors: A review of recent advances. http://www.research.ibm.com/journal/rd/451/dimitrakopoulos.html, IBM Journal of Research and Development, Jan. 2001.

L. Dong et al. Fabrication and characterization of integrated uncooled infrared sensor arrays using a-Si thin-film transistors as active elements. J. Microelectromech. Syst., vol. 14, pp. 1167-1177 (2005).

G.C. East et al. Wet spinning of chitosan and the acetylation of chitosan fibers. J. Appl. Polym. Sci., vol. 50, pp. 1773-1779 (1993).

W.P. Eaton et al. Micromachined pressure sensors: Review and recent developments. Smart Material Structures, vol. 6, pp. 530-539 (1997).

M. Esashi et al. Vacuum-sealed silicon micromachined pressure sensors. Proc. IEEE, vol. 86, No. 6, pp. 1627-1639 (1998).

W.G. Evans. Infrared radiation sensors of *Melanophila acuminata* (Coleoptera:Buprestidae): A thermopneumatic model. Ann. Entomol. Soc. Am., vol. 98, pp. 738-746 (2005).

W.G. Evans. Morphology of the infrared sense organs of *Melanophila acuminata* (Buprestidae: Coleoptera). Ann. Entomol. Soc. Am., vol. 59, pp. 837-877 (1966).

W.G. Evans. Perception of infrared radiation from forest fires by *Melanophila acuminata* de Geer (Buprestidae, Coleoptera). Ecology, vol. 47, pp. 1061-1065 (1966).

W.G. Evans. Infra-red receptors in *Melanophila acuminata* DeGeer. Nature, vol. 202, pp. 211 (1964).

R. Fernandes et al. Thermo-biolithography: A technique for patterning nucleic acids and proteins. Langmuir, vol. 20, No. 3, pp. 906-913 (2004).

M.A. Fonseca et al. Wireless micromachined ceramic pressure sensor for high-temperature applications. J. Microelectromech. Syst., vol. 11, No. 4, pp. 337-343 (2002).

H. Gleskova et al. Electrical response of amorphous silicon thin-film transistors under mechanical strain. J. Appl. Phys., vol. 92, pp. 6224-6229 (2002).

D.X. Hammer et al. Investigation of the transduction mechanism of infrared detection in *Melanophila acuminata*: Photo-thermal-mechanical hypothesis. Comp. Biochem. and Physiol. Part A, vol. 132, pp. 381-392 (2002).

D.X. Hammer et al. Sensitivity threshold and response characteristics of infrared deteection in the beetle *Melanophila acuminata* (Coleophtera:Buprestidae). Comp. Biochem. and Physiol. Part A, vol. 128, pp. 805-819 (2001).

D.X. Hammer et al. Infrared spectral sensitivity of *Melanophila acuminata*. J. Insect Physiol., vol. 47, pp. 1441-1450 (2001).

C. Hautamaki et al. Experimental evaluation of MEMS strain sensors embedded in composites. J. Microelectromech. Syst., vol. 8, No. 3, pp. 272-279 (1999).

J. Hazel et al. Ultramicrostructure and microthermomechanics of biological IR detectors: Materials properties from a biomimetic perspective. Biomacromolecules, vol. 2, pp. 304-312 (2001).

P.I. Hsu et al. Thin-film transistor circuits on large-area spherical surfaces. Appl. Phys. Lett., vol. 81, pp. 1723-1725 (2002).

K. Ivanova et al. Micromachined arch-type cantilever as high sensitivity uncooled infrared detector. J. Vac. Sci. Technology B, vol. 23, pp. 3153-3157 (2005).

E. Khor et al. Reversible water-swellable chitin gel. J. Polym. Sci. Part A: Polymer chemistry, vol. 35, No. 10, pp. 2049-2053 (2000).

J.Z. Knaul et al. Crosslinking of chitosan fibers with dialdehydes: Proposal of a new reaction mechanism. J. Polym. Sci. Part B: Polymer Physics, vol. 37, pp. 1079-1094 (1999).

M.N.V.R. Kumar. A review of chitin and chitosan applications. React. Funct. Polym., vol. 46, pp. 1-27 (2000).

L.P. Lee et al. Inspirations from biological optics for advanced photonic systems. Science, vol. 310, pp. 1148-1150 (2005).

M. Lei et al. High-resolution technique for fabricating environmentally sensitive hydrogel microstructures. Langmuir, vol. 20, pp. 8947-8951 (2004).

M.C. LeMieux et al. Polymeric nanolayers as actuators for ultrasensitive thermal bimorphs. Nano Letters, vol. 6, pp. 730-734 (2006).

B. Li. Design and simulation of an uncooled double-cantilever microbolometer with the potential for ~mK NETD. Sensors and Actuators A: Physical, vol. 112, pp. 351-359 (2004).

L. Lin et al. A micro strain gauge with mechanical amplifier. J. Microelectromech. Syst., vol. 6, No. 4, pp. 313-321 (1997).

Y. Lin et al. Trilayer ceramic-metal-polymer microcantilevers with dramatically enhanced thermal sensitivity. Advanced Materials, vol. 18, pp. 1157-1161 (2006).

J.M. Lippmann. Design and fabrication of MEMS resonant strain sensor in SOI. Master's Thesis, University of California, Berkeley (2004).

X.L.J. Luo et al. Electrochemically deposited nanocomposite of chitosan and carbon nanotubes for biosensor application. Chem. Comm., vol. 16, pp. 2169-2171 (2005).

W.H. Nosal et al. UV-vis-infrared optical and AFM study of spin-cast chitosan films. Colloids Surf. B: Biointerfaces, vol. 43, Nos. 3-4, pp. 131-137 (Jul. 2005).

J. Nunthanid et al. Physical properties and molecular behavior of chitosan. Drug Dev. Ind. Pharm., vol. 27, No. 2, pp. 143-157 (2001).

P.L. Richards. Bolometers for infrared and millimeter waves. J. Appl. Phys., vol. 76, No. 1, pp. 1-24 (1994).

A. Rogalski et al. Infrared devices and techniques. Opto-electronics Review, vol. 10, pp. 111-136 (2002).

A. Rogalski. Infrared detectors at the beginning of the next millennium. Proc. SPIE Int. Soc. Opt. Eng., vol. 4413, pp. 307-322 (2001).

K.R. Sarma et al. Active matrix OLED using a 150° C. a-Si TFT backplane built on flexible plastic substrate in flexible flat panel displays. Presented at SPIE Symposium on Aerospace/Defense Sensing, Orlando, Florida, Apr. 2003.

H. Schmitz et al. Responses of the infrared sensilla of *Melanophila acuminata* (Coleoptera: Buprestidae) to monochrome infrared stimulation. J. Comp. Physiol. A, vol. 186, pp. 543-549 (2000).

H. Schmitz et al. The photomechanic infrared receptor for the detection of forest fires in the beetle *Melanophila acuminata* (Coleoptera: Buprestidae). J. Comp. Physiol. A, vol. 182, pp. 647-657 (1998).

H. Schmitz et al. Infrared detection in a beetle. Nature, vol. 386, pp. 773-774 (1997).

Y. Shigemasa et al. Evaluation of different absorbance ratios from infrared spectroscopy for analyzing the degree of deacetylation in chitin. Int. J. Biol. Macromol., vol. 18, pp. 237-242 (1996).

L.A. Sowards et al. Characterization of beetle *Melanophila acuminata* (Coleoptera: Buprestidae) infrared pit organs by high-performance liquid chromatography/mass spectrometry, scanning electron microscope, and Fourier transform-infrared spectroscopy. Ann. Entomol. Soc. Am., vol. 94, pp. 686-694 (2001).

T. Vondran et al. The infrared receptor of *Melanophila acuminata* De Geer (Coleoptera: Buprestidae): Ultrastructural study of a unique insect thermoreceptor and its possible descent from a hair mechanoreceptor. Tissue & Cell, vol. 27, pp. 645-658 (1995).

C. Wenling et al. Effects of the degree of deacetylation on the physicochemical properties and Schwann cell affinity of chitosan films. J. Biomaterials Appl., vol. 20, No. 2, pp. 157-177 (Oct. 2005).

K.E. Wojciechowski et al. A MEMS resonant strain sensor with 33 nano-strain resolution in a 10kHz bandwidth. IEEE Sensors 2005 (2005).

K.E. Wojciechowski et al. A MEMS resonant strain sensor operated in air. 17th IEEE Conference on Micro Electro Mechanical Systems, pp. 841-845 (2004).

M.A. Wolfson. A high-resolution resonant MEMS strain gauge. Master's Thesis, University of California, Berkeley (2000).

L. Wu et al. Voltage-dependent assembly of the polysaccharide chitosan onto an electrode surface. Langmuir, vol. 18, pp. 8620-8625 (2002).

D.R. Wur et al. Polycrystalline diamond pressure sensor. J. Microelectromech. Syst., vol. 4, No. 1, pp. 34-41 (1995).

H. Yi et al. Biofabrication with chitosan. Biomacromolecules, vol. 6, pp. 2881-2894 (2005).

Y. Yu et al. Photodeformable polymers: A new kind of promising smart material for micro- and nano-applications. Macromol. Chem. Phys., vol. 206, pp. 1705-1708 (2005).

T. Nakashima et al. Mechanical Properties and antibacterial efficacy of chitosan films. Biocontrol Sci., vol. 11, No. 1, pp. 27-36 (2006).

S.R. Hunter et al. High sensitivity uncooled microcantilever infrared imaging arrays. Infrared Technology and Applications XXIX, Proc. SPIE, vol. 5074, pp. 469-480 (2003).

* cited by examiner

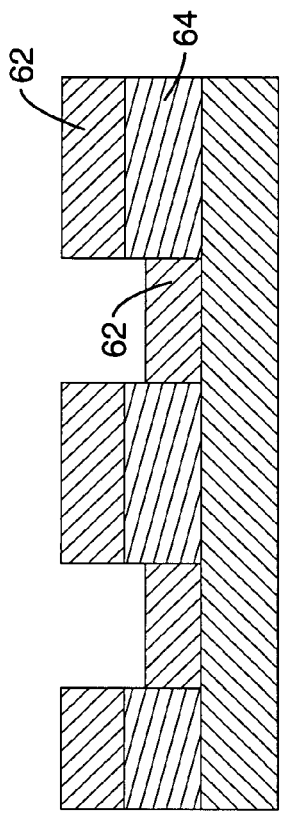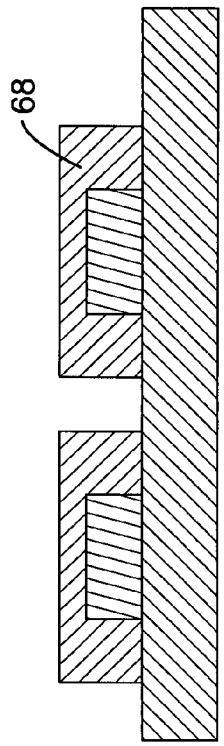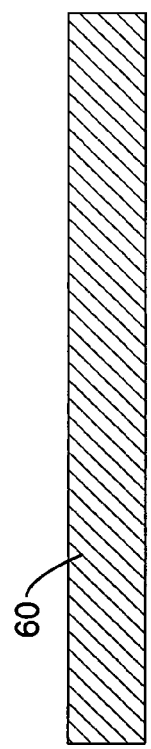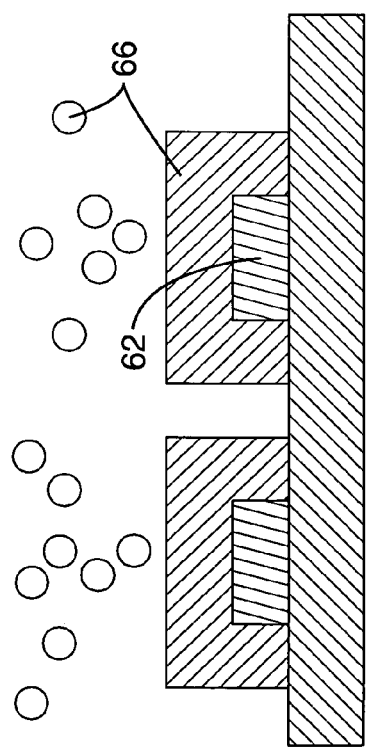
FIG. 8A
FIG. 8B
FIG. 8C
FIG. 8D

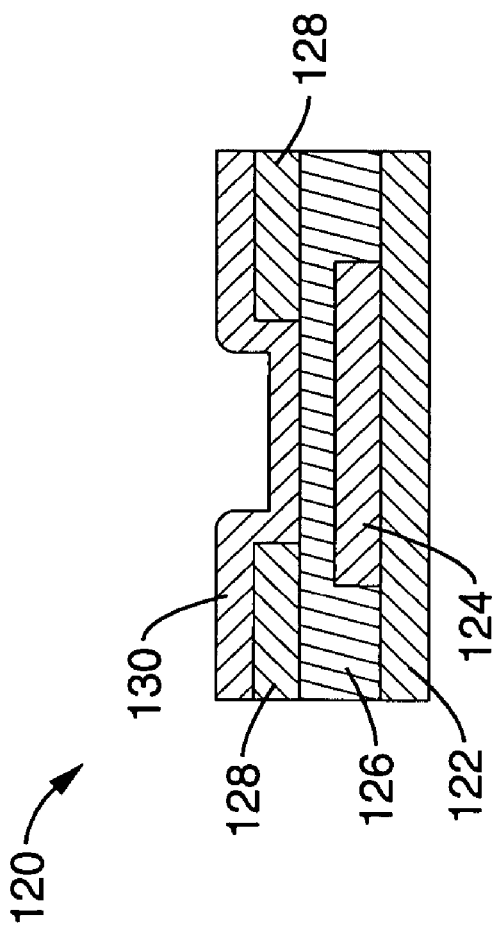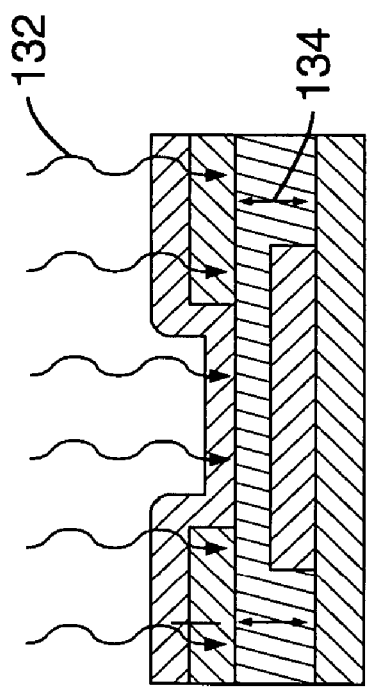

INFRARED SENSOR SYSTEMS AND DEVICES

CROSS-REFERENCE TO RELATED APPLICATIONS

This application claims priority from U.S. provisional application Ser. No. 60/697,741, filed on Jul. 7, 2005, incorporated herein by reference in its entirety.

STATEMENT REGARDING FEDERALLY SPONSORED RESEARCH OR DEVELOPMENT

This invention was made with Government support under Grant No. FA9550-05-1-0422, awarded by the AFSOR. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

A portion of the material in this patent document is also subject to protection under the maskwork registration laws of the United States and of other countries. The owner of the maskwork rights has no objection to the facsimile reproduction by anyone of the patent document or the patent disclosure, as it appears in the United States Patent and Trademark Office publicly available file or records, but otherwise reserves all maskwork rights whatsoever. The maskwork owner does not hereby waive any of its rights to have this patent document maintained in secrecy, including without limitation its rights pursuant to 37 C.F.R. § 1.14.

BACKGROUND OF THE INVENTION

1. Field of the Invention

This invention generally relates to strain sensor for sensing a change in strain induced by the presence of infrared radiation, and more particularly to infrared sensors comprising organic materials.

2. Description of Related Art

Infrared sensors have many medical, military, industrial and commercial applications. These IR sensors can be generally broken down into two categories—photonic and thermal. Photonic IR sensors have very narrow bands and require cryocooling for operation which results in high power consumption and very large bulk. Though photon detectors may have fast scanning rates and very high sensitivities, the extra bulk that results from using a cooling apparatus is a serious trade-off in achieving high imaging speeds. A significant market exists for infrared detectors that show comparable performance to photon detectors without using cooling. Thermal detectors form a class of infrared detectors, including pyroelectrics, bolometers, thermistors, thermopiles and Golay cells, and are generally uncooled.

Of the thermal sensors, microbolometers show the most promise, due to their seemingly lower sensitivity to noise. However, both microbolometers and pyroelectrics are electro-resistive devices and thus still quite sensitive to thermal noise resulting in lower sensitivities and resolutions compared to cryocooled photonic IR sensors. Their designs are also not as scalable such that pixel sizes are usually 30 or more microns. Microbolometers also require thermal stabilization to attain competitive sensitivities which requires maintenance of temperatures surrounding the device through thermoelectric coolers and/or extensive and often complex circuitry. The noise equivalent change in temperature (NEDT) of current uncooled thermal devices is around 20 mK and at least around an order higher than state-of-the-art photonic IR sensors. To bring the NEDT of uncooled microbolometers closer to that of photonic devices various structures have been suggested, such as double cantilevers, but the structure scalability is sacrificed reducing array resolution. Also, the non-uniformities of the surface of the devices also contribute to sensing problems.

Background on the Material Properties of Chitin

Chitin is the most common nitrogen bearing polysaccharide, and is second only to cellulose as the most abundant polysaccharide formed in nature. Chitin is a polymer of N-acetyl glucosamine (GlcNAc). It is commonly found in the exoskeletons of crustaceans and insects, in the form of thread-like polymer chains of chitin. The spectrum of chitin shows infrared absorption at the 3, 6, and 9 µm bands, corresponding to the presence of carbon-hydrogen single bonds (C—H), carbon oxygen double bonds (C═O), and carbon-oxygen single bonds (C—O), respectively. Additional absorption at 3 µm is due to nitrogen-hydrogen (N—H) single bonds and oxygen-hydrogen single bonds (O—H). Chitin is highly acetylated, with the percent acetylation varying depending on the source of the chitin. Although many insects and crustaceans contain chitin, it is *Melanophila acuminata's* IR-sensitive pit organ (which is largely composed of chitin), combined with chitin's peak IR absorption and the insect's peak behavioral response to 3 µm radiation that suggests chitin's involvement in the detection of forest fires. The jewel beetle's chitin-composed pit organ is innervated, allowing transduction of the IR absorption into an electrical signal through an action potential.

Infrared absorption occurs when the frequency of the incident infrared energy matches the vibrational resonance of the bond, and a change in dipole moment occurs during the vibration. The absorbed infrared radiation causes either stretching or bending of the bond. To maximize the photomechanical response, the stretching of the bond should translate either throughout the length of a polymer, or between parallel chains.

Chitin is not commonly used in semiconductor and MEMS (microelectromechanical system) devices, and many of its material properties have not yet been characterized. However, the infrared response of chitin makes it useful as a sensory material. See Table 1. Deposition of chitin into a thin film is difficult because it is not water soluble. Chitosan is the deacetylated form of chitin. Chitosan is soluble in water, while chitin is not. Chitosan is soluble in acidic solutions and insoluble in basic solutions. Chitosan may be more easily deposited than chitin due to its net positive charge and solubility in water and acidic solution, which allows it to be electrodeposited.

BRIEF SUMMARY OF THE INVENTION

An organic material can be used in a modified strain gauge for IR transduction, resulting in an organic IR sensor. Infrared radiation incident on the organic material modulates a displacement of the material in order to detect the presence and intensity of IR radiation. In addition, a photomechanical polymer can be used in a transistor based on a thin-film transistor (TFT), also resulting in an IR sensor. The photomechanical response of either sensor can be tailored to certain IR bands for detection purposes.

An aspect of the invention is a strain sensor, comprising: a first strain-sensitive device; wherein the first strain-sensitive device comprises an infrared sensing material; wherein absorption of infrared radiation by the infrared sensing material produces strain in the first strain-sensitive device.

In other embodiments of this aspect, the infrared sensing material comprises a polymer, an organic polymer, chitin or chitin derivatives.

In another embodiment of this aspect, a portion of the strain-sensing device is coated with the polymer.

In another embodiment, the strain-sensitive device is a MEMS device. In a further embodiment, the MEMS device comprises an organic polymer.

Another embodiment further comprises a plurality of strain-sensitive devices; wherein each strain-sensitive device comprises an infrared sensing material; and wherein the plurality of strain-sensitive devices is oriented in an array.

Another embodiment further comprises a second strain-sensitive device; wherein the first strain-sensitive device comprises an infrared sensing material; wherein the second strain-sensitive device lacks an infrared sensing material; and wherein the first strain-sensitive device and the second strain-sensitive device are in a differential configuration.

In other embodiments, the infrared sensing material is sensitive to wavelengths emitted by forest fires or humans.

Another aspect of the invention is an infrared sensor, comprising: a photomechanical thin film transistor (PTFT); wherein the PTFT comprises: a photomechanical polymer layer; wherein the photomechanical polymer layer is sensitive to infrared radiation.

In one embodiment, the photomechanical polymer layer is located on top of said PTFT.

In another embodiment, the PTFT further comprises: a semiconductor layer; wherein the semiconductor layer is partially or fully transparent to infrared radiation; and wherein the photomechanical polymer layer is located below the semiconductor layer.

In another embodiment, the photomechanical polymer layer comprises chitin or chitin derivatives.

In another embodiment, the photomechanical polymer layer is sensitive to wavelengths emitted by forest fires or humans.

A still further aspect of the invention is an infrared sensor, comprising: a thin film transistor; wherein the thin film transistor comprises: a gate dielectric; wherein the gate dielectric comprises a polymer.

In one embodiment, the polymer comprises an organic polymer.

In another embodiment, the polymer comprises a photomechanical polymer.

In another embodiment, the polymer comprises chitin or chitin derivatives.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIGS. 8A-8D show an embodiment of electrodepositing a chitosan layer on a silicon layer.

FIGS. 17A-17B show an embodiment of a strain sensor according to the present invention and its behavior when exposed to infrared radiation.

DETAILED DESCRIPTION OF THE INVENTION

Figure 1:
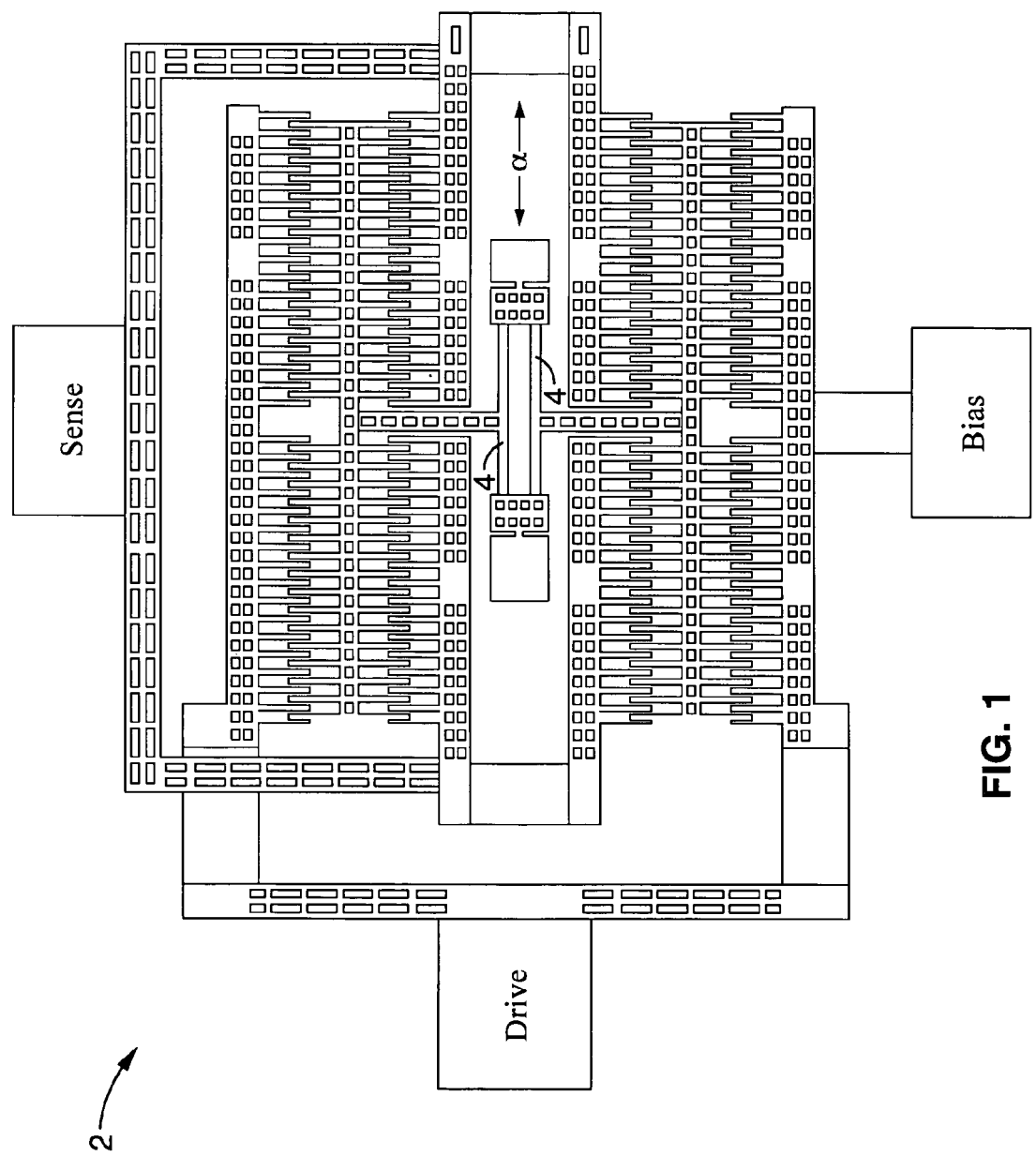
FIG. 1 shows one embodiment of a MEMS double-ended tuning fork strain gauge.

Referring more specifically to the drawings, for illustrative purposes the present invention is embodied in the apparatus generally shown in FIG. 1 through FIG. 19. It will be appreciated that the apparatus may vary as to configuration and as to details of the parts, and that the method may vary as to the specific steps and sequence, without departing from the basic concepts as disclosed herein.

The present invention relates to the use of organic polymers, such as chitin, in the detection of infrared radiation. Exposure of photomechanical polymers to infrared radiation produces strain in the polymers, which can be utilized in various settings.

For example, a photomechanical polymer can be incorporated into a mechanical strain gauge or into a MEMS-based device, in which the photomechanical stretching induced by the radiation produces a frequency-modulated output. In another embodiment, a photomechanical polymer can be incorporated into a thin-film transistor, in which the photomechanical stretching strains the transistor channel and alters the transistor current.

Section 1—Organic IR-Detecting Strain Gauge

One embodiment of the present invention is directed to an organic strain gauge of the type which uses an organic material for modulation of a displacement. See FIG. 1, which shows one embodiment, comprising a MEMS double-ended tuning fork (DETF) strain gauge 2, where the double-ended tuning fork 4 is modified to contain a thin film of chitosan on the fork surface. The strain is exhibited in direction α. In an alternative embodiment, the drive and bias labels can be reversed. In another alternative embodiment, portion of the gauge are comprised of an organic polymer, rather than being merely a coating.

The infrared absorption spectrum of the material used in the construction of the strain gauge (e.g., chitin) makes it respond to changes in infrared radiation. Strain gauge technology, such as metal-foil strain gauges, is well established. In addition, a variety of strain gauges using various transduction techniques have been created as elements in microelectromechanical systems (MEMS). Examples of MEMS strain gauges include those made of polycrystalline diamond, silicon, ceramic, etc. However, a strain gauge using chitin and/or chitin derivatives has not been reported to date. Strain gauges using piezoresistance produce a resistance change that may be detected by an electrical circuit.

Alternatively, a change in oscillation may be used for strain readout using a frequency modulation rather than direct current measurement. The IR-sensitive strain gauge may be applied to the sensing of forest fires, which emit infrared radiation near the 3 μm band, or human infrared radiation, which is emitted near the 9 μm band. Such a strain sensor may be used as a component of a pedestrian avoidance system, in the diagnosis of disease, such as SARS or cancer, and in forestry, medical thermography, night vision, and astronomy.

It has been observed that the fire beetle *Melanophila acuminata* has a receptor for infrared radiation which is composed of chitin. Chitin is the second most abundant polysaccharide, behind cellulose, and undergoes a mechanical strain in response to infrared radiation, particularly at the 3 μm, 6 μm, and 9 μm wavelengths. The infrared sensor array of the present invention uses a biomimetic approach based on the sensory structure of the fire beetle *Melanophila acuminata*. This device incorporates the unique properties found within the fire beetle (IR-absorbing chitin for detection, uncooled infrared detection, sensitivity to 3 μm and 9 μm wavelengths) into the design of a MEMS-based device. The present invention, therefore, is a strain sensor using chitin as the infrared absorbing material, shown in FIG. 1.

Unlike prior strain sensors, the organic strain sensor is sensitive to infrared radiation. Furthermore, the strain sensor of the present invention operates at ambient temperatures, and scales from a single MEMS-class device to a monolithic large format 2D array.

Figure 2A:
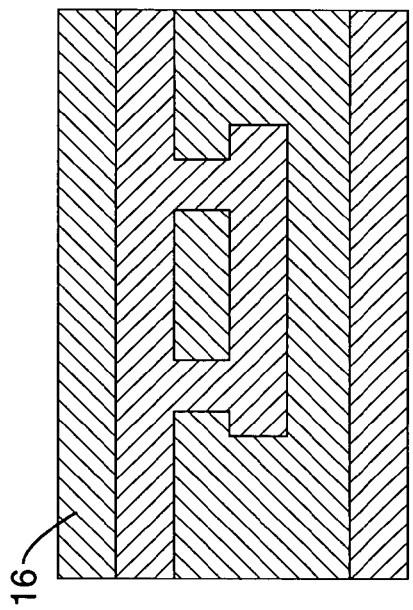
FIGS. 2A-2D depict the general process of adding chitosan to the MEMS fabrication process according to an embodiment of the present invention.
Figure 2B:
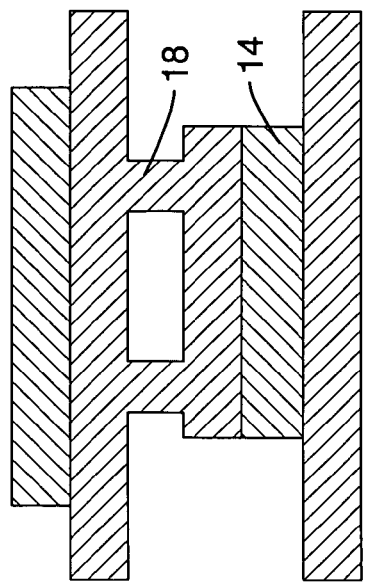
Figure 2C:
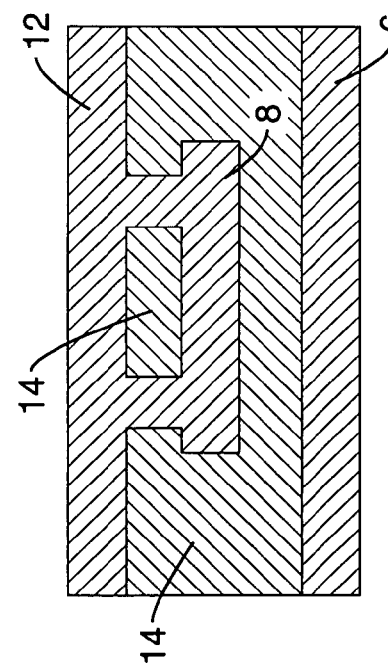
Figure 2D:
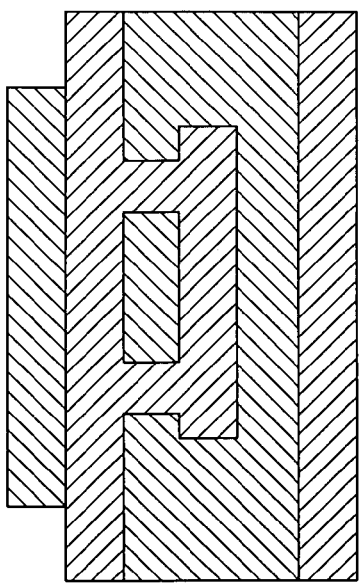

MEMS foundries have produced millions of devices. The present invention modifies those processes to add the deposition of chitosan on the device surface. The general process is shown in FIGS. 2A-2D. FIG. 2A shows a typical MEMS device prior to the release etching of $SiO_2$. The base layer 6 is silicon, and two layers of polysilicon 8, 12 are present, with $SiO_2$ layers 14 interspersed between the layers. Prior to the release etching process, a chitosan layer 16 is deposited on top of the upper polysilicon layer 12 via spin-casting (FIG. 2B). The chitosan layer 16 is then patterned using a photolithographic process, shown in FIG. 2C where some of the chitosan layer 16 has been removed. Finally, the release etching step is performed in FIG. 2D, and the desired portions of the supporting $SiO_2$ layer 14 are removed.

In the end product, the lower polysilicon layer 8 serves as the electrical interconnect, and upper polysilicon layer 12 comprises the mechanical features of the device. The polysilicon layers 8, 12 are connected by electrical contacts 18. The chitosan layer 16 serves as the infrared actuator, and exhibits strain in the presence of infrared radiation. If desired, the chitosan layer 16 can be acetylated to form a chitin layer.

EXAMPLE

The pixel element in one embodiment comprises a MEMS double-ended tuning fork strain gauge with resonant frequency of 217 kHz and Q of 370, where the double-ended tuning fork is modified to contain a thin film of chitosan on the surface. This particular strain gauge was chosen for its high sensitivity, with a resolution of 33 nε. The gauge length is 200 μm, so the strain gauge can detect a displacement of 6.6 pm. The double-ended tuning fork strain gauge is advantageous compared with alternative strain sensing devices such as piezoresistive strain gauges, because it has both higher sensitivity and greater immunity to thermal noise. For a piezoresistive sensor with gauge factor of 30, a 5 με input (what we expect from the infrared photomechanical response of chitosan), will produce a change in resistance of 0.015%, while this change would be produced for a 0.5° C. change in temperature. Due to losses arising from imperfect coupling between layers, the actual amount of strain transmitted from the chitosan layer to the underlying polysilicon layer will be significantly less. The double-ended tuning fork resonates laterally with an antisymmetric mode to prevent energy dissipation to the substrate. Strain applied axially alters the natural frequency of the DETF. The chitosan will apply the strain directly to the tines of the double-ended tuning fork, and this strain will be modulated with IR radiation. The photomechanical stretching of chitosan modulates the resonance of the comb drive, causing deviations from the normal operating frequency of 217 kHz. The change is frequency is approximately linear with a sensitivity of 39 Hz/με. This mechanical alteration produces a frequency modulation (FM) signal at the sense terminal.

A single pixel element is sufficient to form a passive non-imaging seeker for smart weapons systems. In a focal plane array, each comb drive resonator serves as an individual pixel element. A computer forms an image by assembling the data from each pixel into a 2D array, which is then output to a display. Alternatively, combining an array with computer algorithms can be used to improve performance by further filtering noise.

Performance

The ability to detect infrared radiation from a distance of more than 12 km is impressive. The author is unaware of any infrared detector capable of imaging from such distances without the use of specialized optics. Direct comparison of range and minimum detectable infrared power with existing devices is difficult because of the classified or proprietary nature of many competing devices. One estimate is the physiological threshold needed to produce an action potential within the beetle, which is 500 μW/cm², whereas another estimate is 60 μW/cm². While this is reported as a power density, we can compare this to the minimum detectable power reported for a variety of thermal detectors by taking into account the area of the double ended tuning fork. The length of each tine is 200 μm, and the width is 5.67 μm. Therefore, the area of each tine is 1134 μm². Because there are two tuning forks (operating in their antisymmetric mode) that will be coated with chitosan, we must multiply this figure by two. Therefore, the total active area of the device is 2268 μm². Converting this to square centimeters, we have 2.268×$10^{-5}$ cm². Multiplying this active area by the power density of 500 μW/cm², we have 0.01134 μW. Converting to Watts, we find a minimum detectable power of $1.13 \times 10^{-8}$ W.

Noise

Several sources of noise affect the performance of traditional infrared thermal detectors: Johnson noise, temperature fluctuation noise, background fluctuation noise and 1/f noise. Johnson noise is due to fluctuations in electric current, and causes thermal agitation of electrons. Johnson noise will only have a meaningful effect on the strain gauge, and will not pose a problem for the chitosan layer, since it is not electrically involved in the device operation. Temperature fluctuation noise is due to the detector's interaction with its heat sink. Background fluctuation noise is due to random changes in temperature due to everything in the environment except the signal. 1/f noise is low frequency flicker noise, and is always present in physical systems, and its origins are not well understood.

The beetle's mechanoreceptor is sensitive to an edge-triggered rather than a level-triggered stimulus, which provides some degree of noise immunity to slowly varying fluctuations in the environment. The phasic mechanoreceptor acts much like a Schmitt trigger, which responds to the onset of a signal and will not respond to subsequent (potentially noisy) signals until after a specified time delay.

One embodiment of the present invention comprises two strain gauges oriented in a differential configuration, in which one strain gauge comprises an infrared-sensitive material, and the other strain gauge does not have an infrared sensing material. Such a sensor could incorporate signal processing circuitry to improve the signal or to reduce the noise.

The strain gauge itself is an analog device that is not sensitive to the onset, but rather to the strain level at any given moment. This differs from the phasic mechanoreceptor found in *Melanophila acuminata*. However, some of the noise suppression inherent in a sensor with a phasic response can be integrated into the strain gauge using specialized circuitry. One possibility is to arrange the chitosan-coated strain gauge in a differential configuration. One of the gauges has its DETF coated with chitosan, while the other is left uncoated. Such an arrangement allows the cancellation of thermal background noise by providing a differential output. However, some noise will still be present since the cancellation is dependent on how close each strain gauge can be matched, which is a function of manufacturing tolerances. In addition, slight differences in noise occurring over the surface of the strain gauge will evade cancellation, though this source of noise should be small due to the miniaturization of the device.

Sensor Array

A focal plane array is created by tiling the individual pixel elements in a grid. A staring infrared imager using a focal plane array is preferred to a linear array using an optomechanical scanner because the elimination of moving parts reduces size, weight and cost, and increases system reliability. The resolution of the imaging system is limited by the size of the individual pixel elements, the pitch separating each element, and the control and signal processing circuitry (such as multiplexers and A/D converters) used for readout. Because processing costs are essentially fixed for a given wafer size, it is cost efficient to maximize the number of dies that can be produced per wafer.

The core of the pixel (DETF and comb drives) fits within a square footprint of 366 μm by 366 μm. However, the total footprint includes the suspension as well as the three interface electrodes. Also necessary is a ΣΔ phase locked loop for processing the output of the strain gauge into a readable format. Accounting for the space occupied by the sensor and associated electronics, we estimate the total footprint to occupy approximately 550 μm by 550 μm. The relatively large pixel size is a consequence of using an already available strain gauge not yet optimized for infrared performance. Thus, the strain gauge may be modified to further reduce its size.

Section 2: IR Sensor Utilizing Photomechanic Polymers

This embodiment is an IR sensor utilizing the structure of a thin-film transistor (TFT) with a photomechanical polymer replacing the dielectric layer, being integrated into the semiconductor active layer, or patterned on top of the semiconductor active layer. Unlike prior TFTs, the photomechanical thin-film transistor (PTFT) of the present invention is sensitive to infrared radiation.

Many organic and inorganic polymers exhibit characteristic IR absorption profiles dependent on the molecules and bond structures. Absorption of the infrared radiation causes conformational changes leading to compressing, stretching, bending or twisting of the base units resulting in a photomechanical response of the polymer. The increase of heat due to the absorption of the IR can also produce secondary thermal expansion of the polymer to a piezoelectric response from the polymer due to mechanical stretching. In general, these primary and secondary responses can be defined as a photomechanical response. Through careful synthesis of the polymers, the photomechanical response can be tailored to certain IR bands for detection purposes.

Wavelengths and corresponding bands of most interest are the 3 μm and 9 μm bands and their corresponding application toward the detection of IR from fires and mammals like humans. Due to chitin's good photomechanical response to the 3 μm and 9 μm bands, it is the primary material of interest for use in the sensor device. The jewel beetle *Melanophila acuminata* employs chitin in its sensilla to detect the 3 μm IR from forest fires and follow it to the source to lay their eggs in the burned out trees indicating chitin's varying response to the intensity of the IR as well as its presence. Chitin's IR response can be specially tailored to the 3 μm and 9 μm bands for detection of fires and humans, respectively.

Polymers also have insulative properties and many show semiconductor properties. By integrating the polymers into the dielectric layer, the channel, or on top of the channel of a transistor device, the conformational changes in the polymer during infrared irradiation can be used to alter the dielectric and/or semiconductor properties of the proposed transistor device. Differential measurement of output voltages or currents of the device can thus indicate the presence and intensity of the IR radiation.

For example, C—H, N—H and O—H bonds all stretch apart when exposed to 3 μm IR. A polymer with many C—H, N—H and O—H bonds located in the dielectric layer, upon irradiation by 3 μm IR, will expand and, if immobilized correctly, will increase the thickness of the dielectric layer. The most pronounced change will occur to the threshold voltage, $V_T$, which will increase. Assuming the transistor is operating in saturation mode, the change in $V_T$ will be squared resulting in a much reduced current $I_D$. The current can be changed into a potential and be read accordingly by a corresponding control unit. Should the same polymer be used as the semiconductor or immobilized on top of the semiconductor active layer, the expansion of the polymer from the IR would induce uniaxial or omnidirectional tensile strain. Transduction in polymers (should the semiconductor active layer be a polymer) is primarily by charge hopping and dependant on spacing between bond sites. The more ordered and compact the conjugated polymer is, the higher the mobility. By straining and stretching the polymer chains apart, mobility should drop. The lower mobility would cause a decrease in the current. Transduction in p-type inorganic semiconductors (should the semiconductor active layer be an inorganic material like silicon or germanium) is primarily by holes and the strain from the polymer, would cause the heavy hole band to be pulled below the light hole band allowing greater population of the light hole band and increasing mobility. The increased mobility would cause a linear increase in the current. These PTFTs (photomechanical thin-film transistors) can be arrayed with corresponding control circuitry to create low to high resolution IR sensors. Past OTFTs and chemFETs and similar devices are either only fabricated for output display purposes (and optimized for the function) or for sensing chemical changes in the surrounding environment. As such, PTFTs for IR sensors are completely novel devices with little to no relation to previous devices with similar form.

Since the photomechanical response of the polymers to incident IR radiation are much greater than the response of the polymer to ambient temperature changes, the novel sensor does not require cooling resulting in a large reduction of bulk in comparison to current IR sensors for mid to far-IR ranges. Due to its comparative fabrication to current TFTs used in displays, these sensors can be bulk fabricated and are scalable resulting in resolutions which can be comparable to those of current, cooled IR sensors. Reduction in bulk and an array of flexible substrates result in cost effective, portable and durable sensors. Arrays of the sensors with the addition of collimators and various style lenses can result in directional and full 360° field of view for the device.

Advantages and Applications

PTFTs would be less susceptible to ambient temperature changes due to the direct photomechanical transduction mechanism. Due to the polymer construction, the device would also be much more durable than solid state thermal devices, but just as easily fabricated in bulk. Due to the transistor-based design, the proposed device would also be much more easily scaled than microbolometers leading to higher array resolution. The uncooled nature of the proposed IR sensor will also reduce its bulk and power requirements. The planarity and photomechanical transduction mechanism should lead to much greater thermal stability for the proposed device reducing the circuitry and/or thermoelectric cooling required. It is known that beetles using photomechanical transduction mechanisms to sense forest fires can do so from great distances (10 km or more) which could mean greater uncooled detectivity in comparison to existing IR sensors. Also, the transduction mechanisms used are less sensitive to thermal noise so lower NEDT for the proposed device can be expected in comparison to similar microbolometers. Should this be the case, the PTFT-based devices should become a closer competitor to photonic IR technologies with the advantage of no cooling and lower power requirements. Furthermore, single or groupings of arrays of PTFTs with corresponding control circuitry can be applied to detecting forest fires, people for security systems, thermograms for medical thermography, etc. IR sensors based on PTFTs can be used in pedestrian avoidance systems for vehicles or personnel targeting systems for military operations. The PTFT IR sensor can be merged and used in conjunction with a radar array (preferably of MEMS design) through sensor fusion techniques providing superior imaging capabilities especially for pedestrian avoidance and military targeting systems. A large gain with PTFTs is their polymeric nature making it possible for them to be fabricated on a flexible substrate and thus result in very low cost IR sensors.

Figure 3:
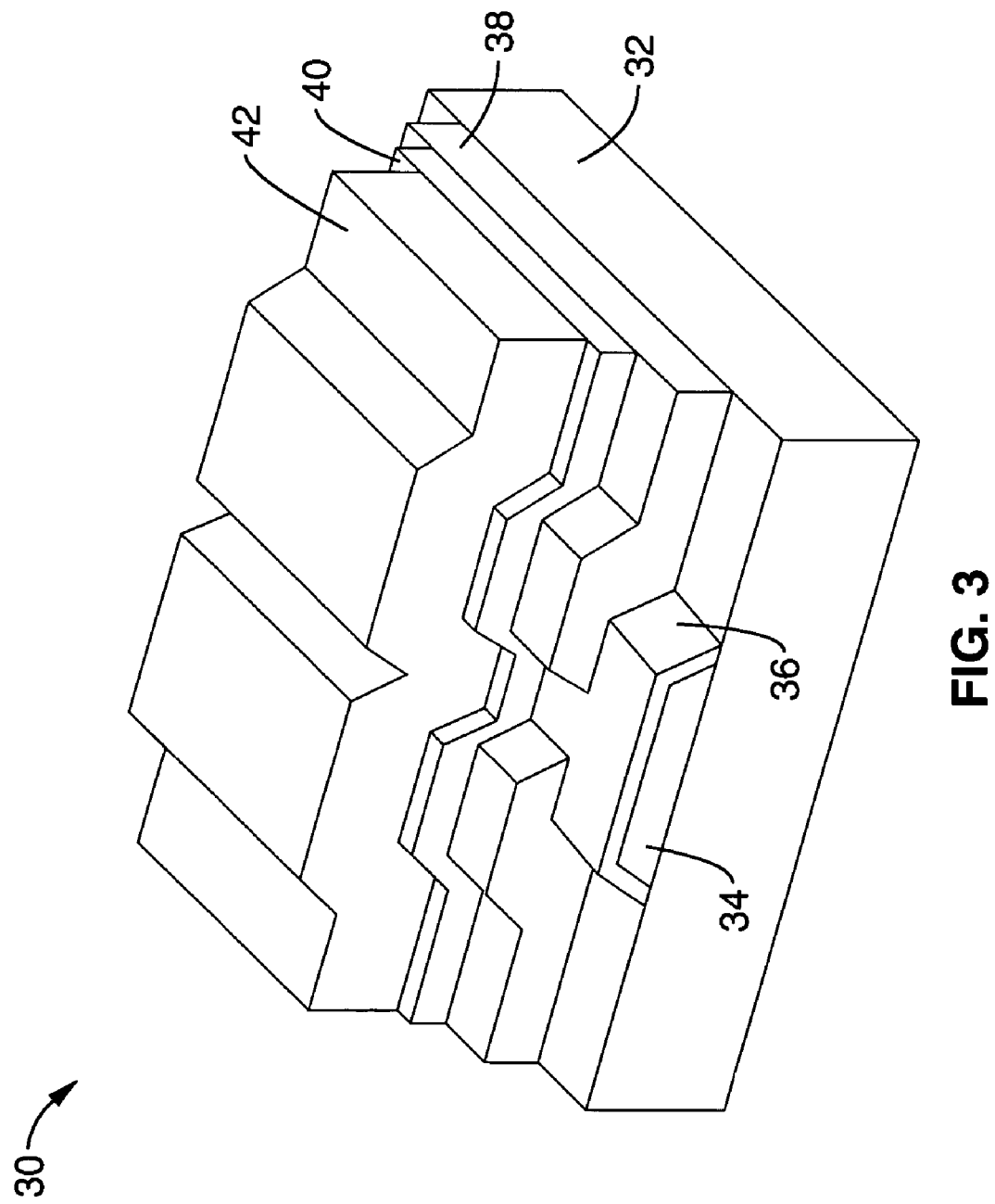
FIG. 3 shows an embodiment of a photomechanical TFT according to the present invention.
Figure 4B:
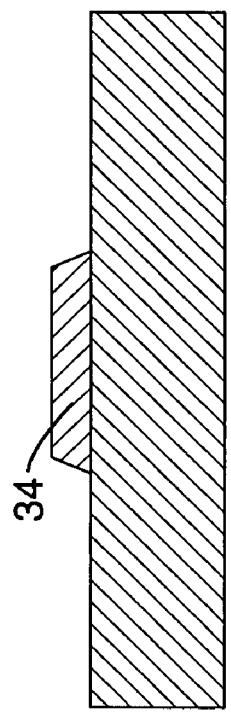
FIGS. 4A-4F depict the general fabrication process for a photomechanical TFT such as that shown in FIG. 3.
Figure 4D:
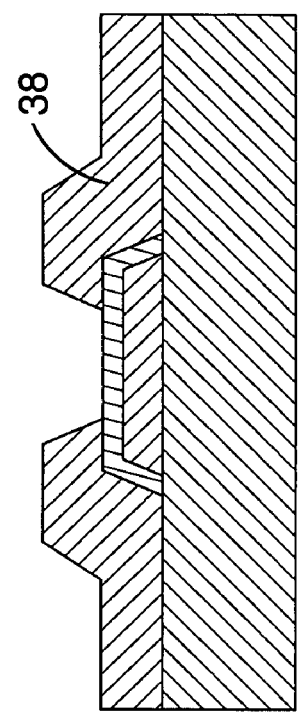
Figure 4A:
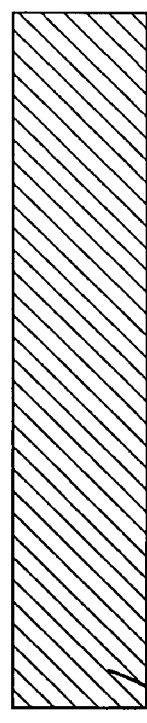
Figure 4C:
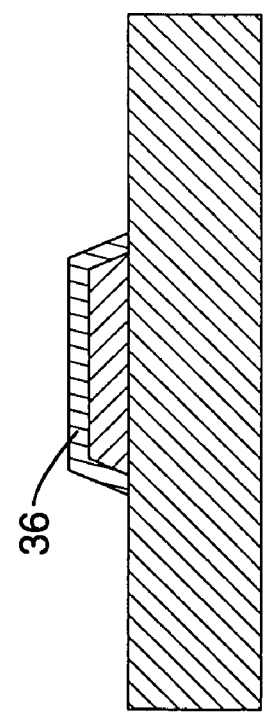
Figure 4E:
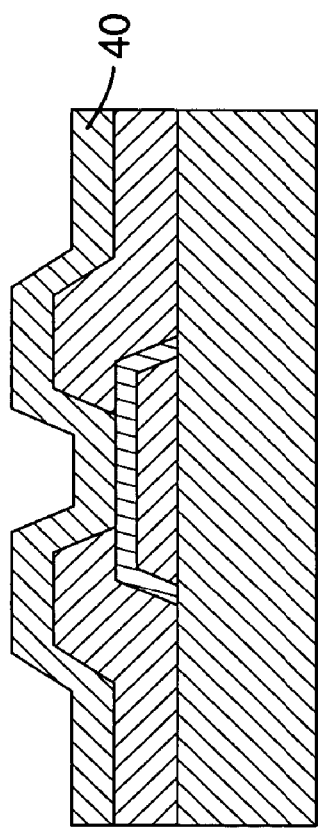
Figure 4F:
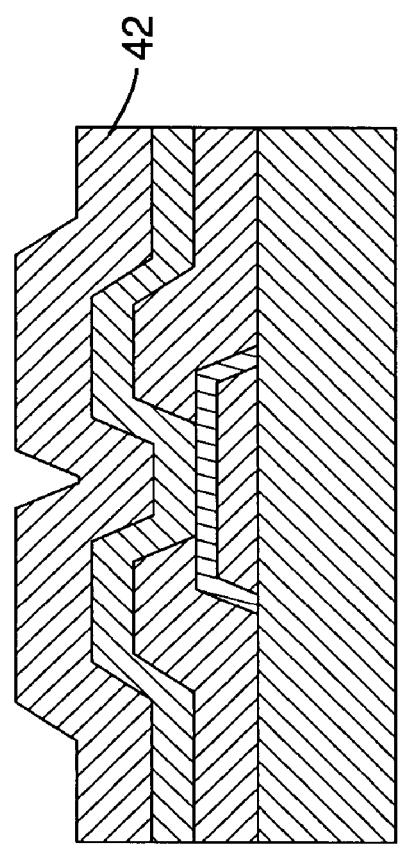

An embodiment of the PTFT of the present invention 30 is depicted in FIG. 3, and the process of fabrication is shown in FIGS. 4A-4F. The fabrication process begins at FIG. 4A with a substrate 32. A gate metal 34 is deposited on the substrate 32 (FIG. 4B). The next step is the depositing and patterning of a low-temperature oxide (LTO) on the gate 34 to form the gate dielectric 36 (FIG. 4C). Next, a metal source/drain 38 is deposited and pattered (FIG. 4D). A layer of amorphous silicon or organic semiconductor material is deposited thereafter as the active layer 40 (FIG. 4E). Finally, a layer of chitosan 42 is spin-coated or electrodeposited over the active layer 40 (FIG. 4F). The solvent in the chitosan layer 42 is subsequently evaporated and chitin is formed by cross-linking or reacetylating the chitosan layer 42.

The preferred method includes the deposition of chitin/chitosan on the active amorphous silicon layer that transduces the IR into strain, which directly strains the transistor channel. The transistor current is altered due to the strain effects of the mobility carriers. Another method of fabricating the PTFT replaces the gate dielectric with chitin/chitosan and utilizes the change in the dielectric constant due to IR irradiation.

Applications and Advantages

These PTFTs are useful in mid- to far-IR radiation sensing in medical, industrial, commercial and military applications. In comparison to existing high-sensitivity sensors for mid to far IR applications, these photomechanical thin-film transistor (PTFT) sensors don't require cooling, resulting in a large reduction in size and complexity—making them cost-effective, portable, and durable. Moreover, due to their fabrication similarity with TFTs used in displays, these PTFT sensors can be bulk fabricated in large volumes and scaled to large arrays.

Section 3: Chitosan

Figure 5:
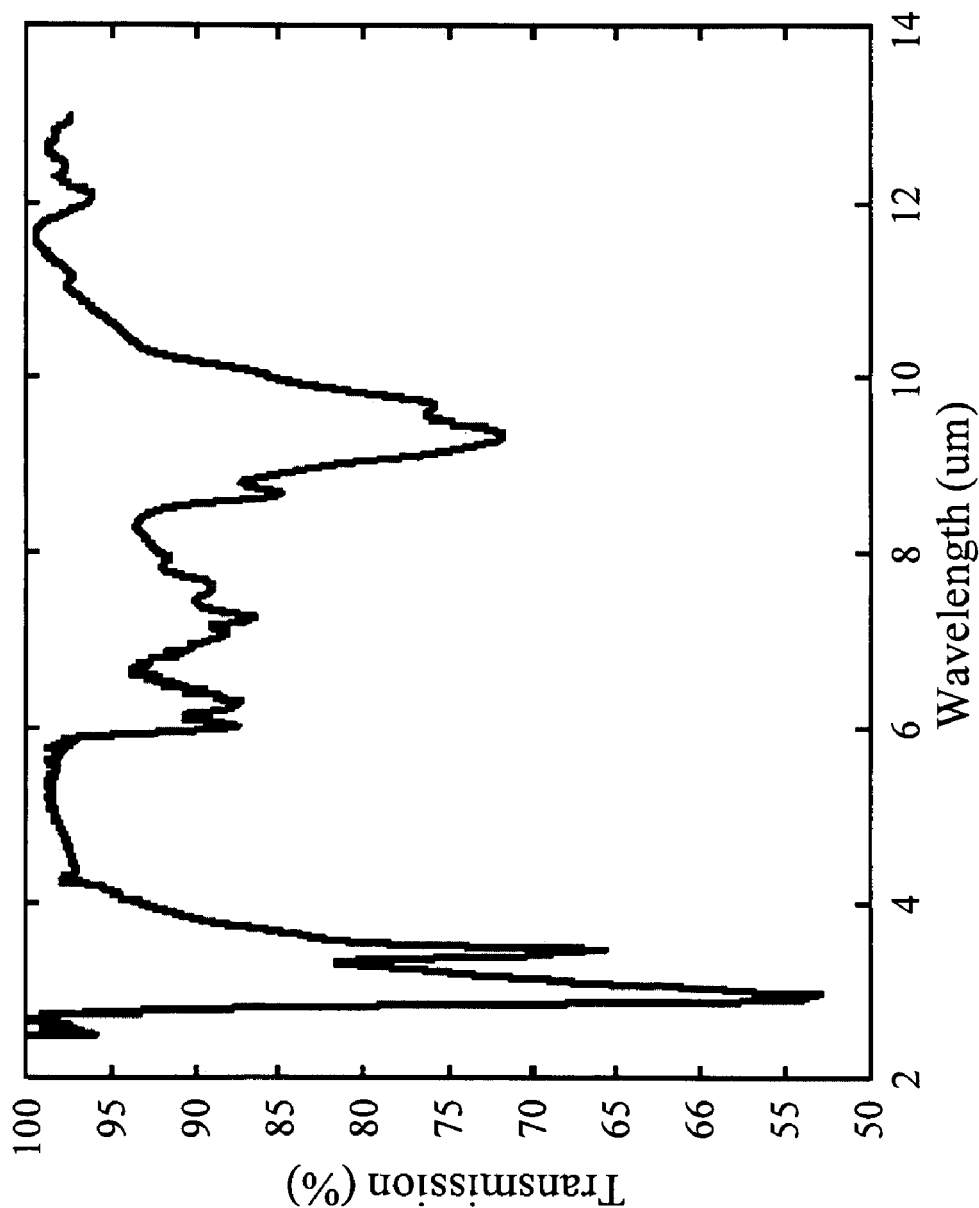
FIG. 5 is an FTIR spectrum of electrodeposited commercially available chitosan.

Chitin is the second most abundant polysacchande in nature. It is a structural material that is biodegradable, exhibits good biocompatibility, and is generally chemically resistant. Thus, chitin is stable over the long term, but its chemical resistance makes it difficult to process. Chitosan (deacetylated chitin), on the other hand, is relatively easy to process. The FTIR spectrum of electrodeposited commercially available chitosan is shown in FIG. 5. Thus, chitosan and chitin can be utilized in the devices of the present invention as the active material to transduce IR into a mechanical or dielectric response.

In various embodiments of the instant invention, low, medium, and high molecular weight chitosan is dissolved in varying concentrations of acetic acid, with deionized water used to control the pH of the solution. 0.22 µm filters are used to purify low molecular weight chitosan solutions, while 1-40 µm filters are used to purify medium and high molecular weight chitosan solutions. The final solution is in hydrogel form, having medium to high viscosity. The deposition of chitosan can be done by spin-casting or by electrodeposition.

Figure 6:
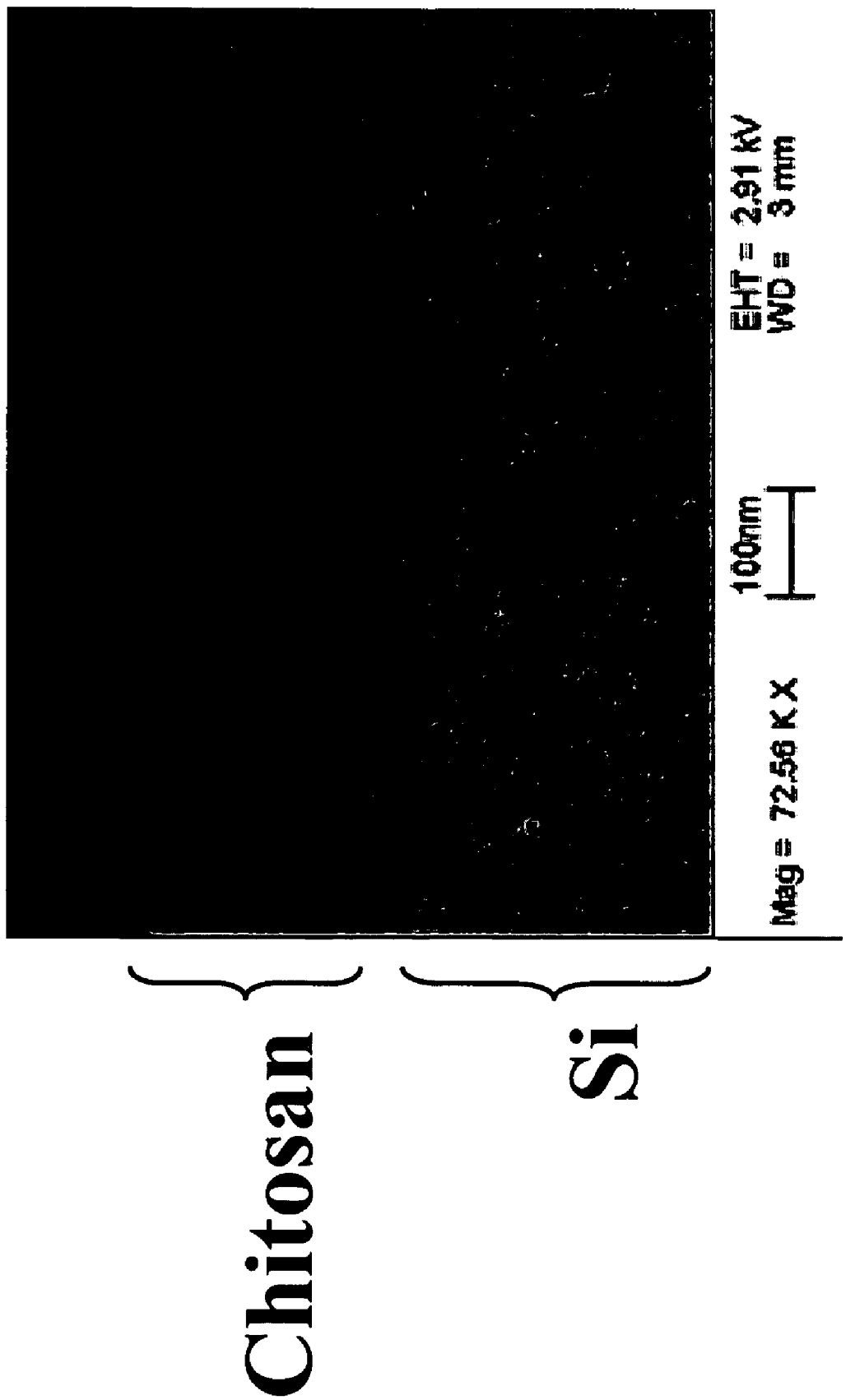
FIG. 6 is an SEM image of a silicon layer having a spin-cast chitosan layer.
Figure 7:
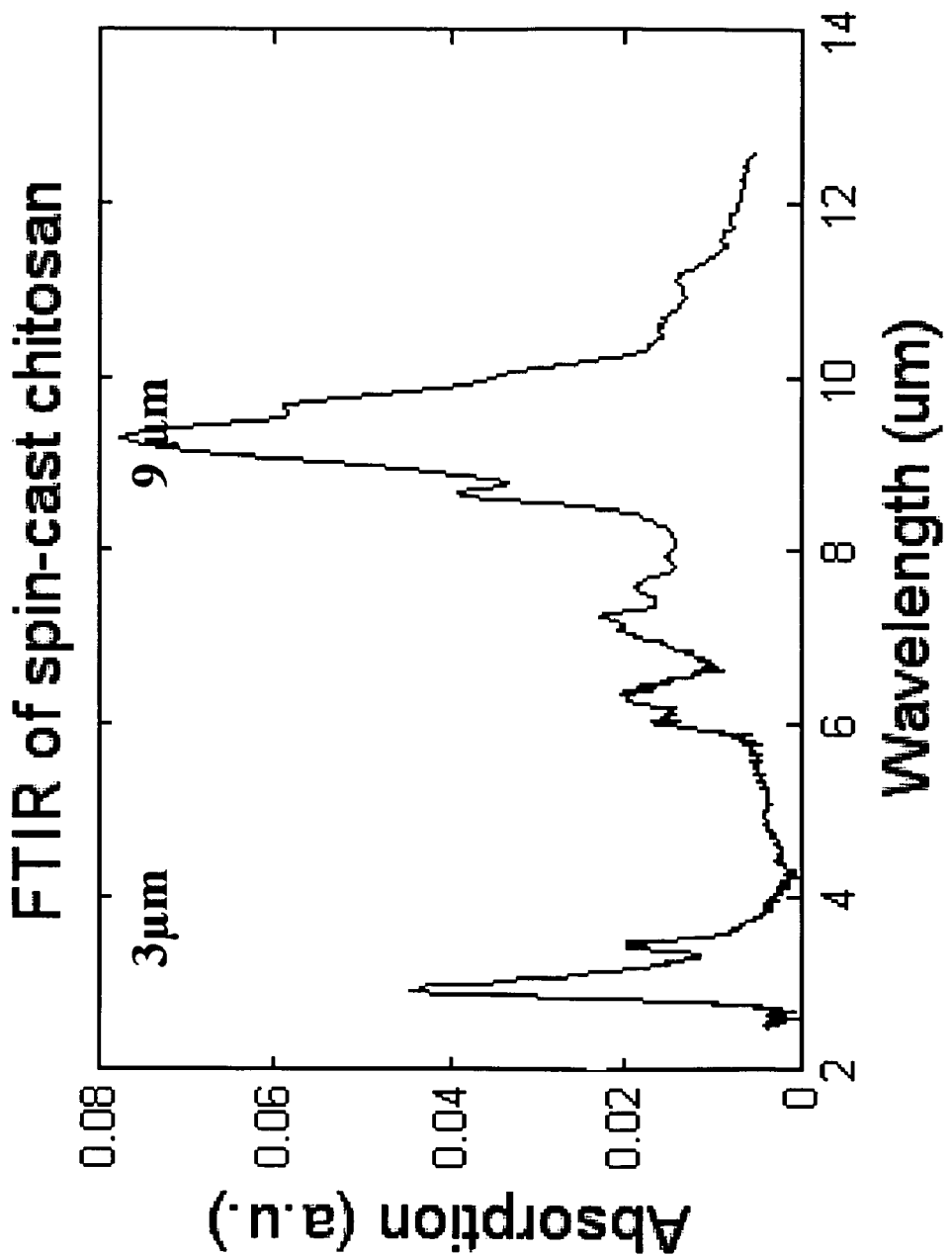
FIG. 7 is an FTIR spectrum of chitosan deposited on silicon by spin-casting.

In spin-cast chitosan solutions, low molecular weight chitosan solutions produce layers that are approximately 30 nm thick, while high molecular weight chitosan solutions produce layers approximately 300 nm thick. Spin-casting can be repeated multiple times to obtain layers of desired thickness. FIG. 6 is an SEM image of a silicon layer having a spin-cast chitosan layer that is approximately 150 nm thick, and FIG. 7 is an FTIR spectrum of chitosan deposited on silicon by spin-casting.

Figure 9:
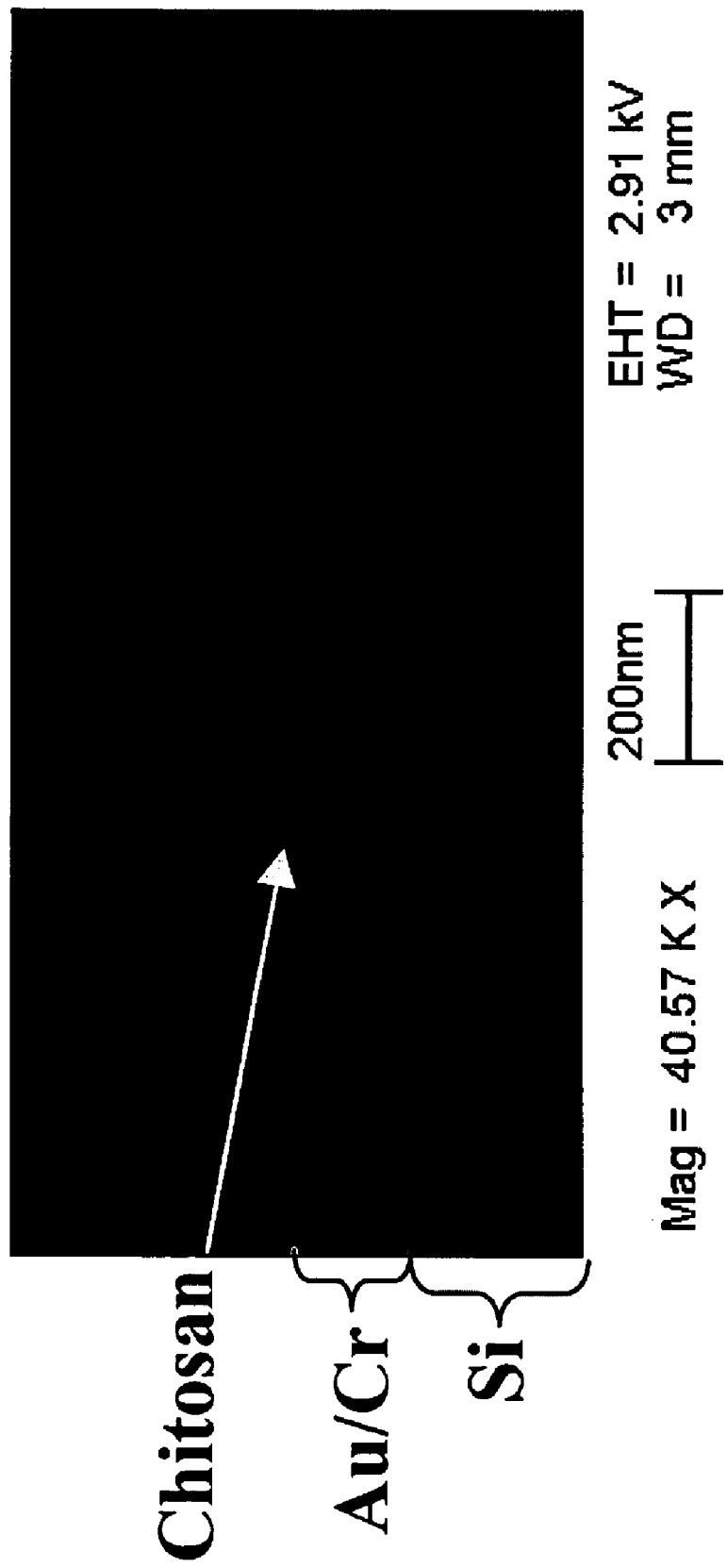
FIG. 9 is an SEM image of electrodeposited chitosan on a gold film layer.
Figure 10:
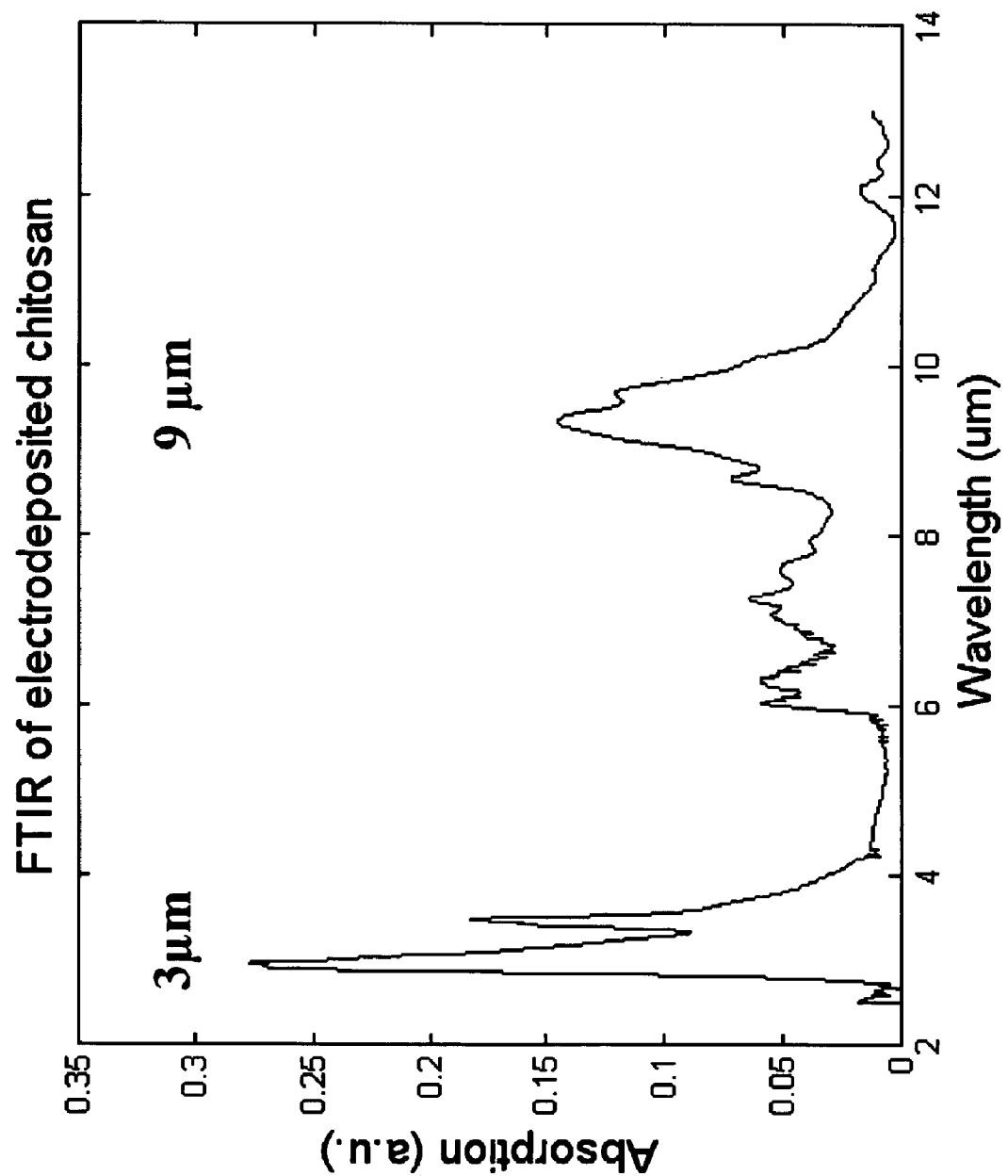
FIG. 10 is an FTIR spectrum of electrodeposited chitosan on gold.

Referring to FIGS. 8A-8D, chitosan electrodeposition begins with a starting material 60, such as silicon (FIG. 8A). A film of Au/Ti 62 is deposited and patterned using photolithographic methods (FIG. 8B) with lift off of the photoresist layer 64 (FIG. 8C). A chitosan layer 66 is electrodeposited on the patterned conductive surface (FIG. 8D). The thickness of the electrodeposited layer is controlled by the plating time. If desired, the solvent is evaporated from the chitosan layer 66 and the layer is processed to convert the chitosan back to chitin 68. FIG. 9 is an SEM image of electrodeposited chitosan in a layer that is approximately 30 nm thick. FIG. 10 is an FTIR spectrum of electrodeposited chitosan on gold. In this embodiment, the gold acts as an IR reflector, so the IR response is enhanced because it strikes the chitosan twice.

Figure 11:
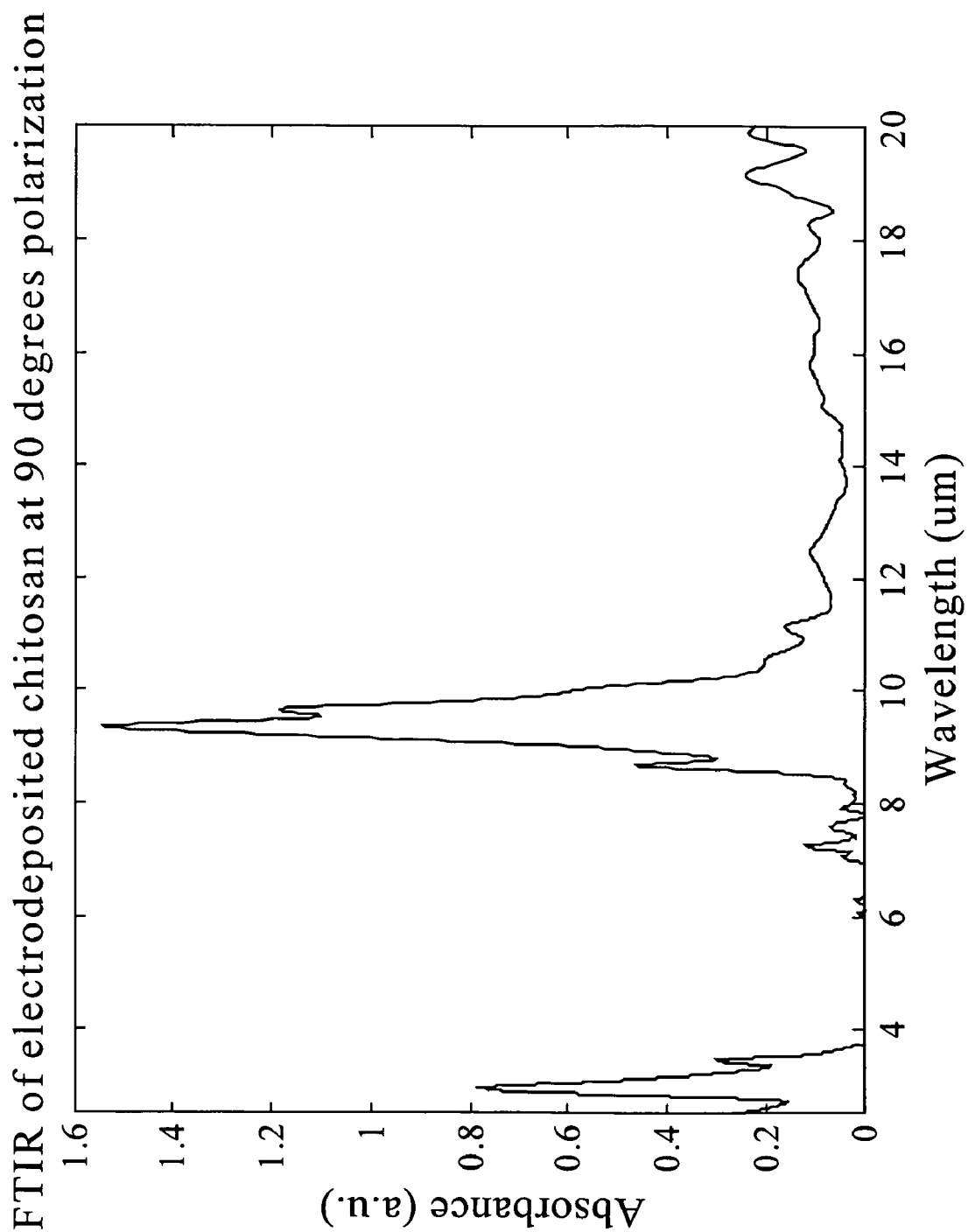
FIG. 11 is an FTIR spectrum of electrodeposited chitosan using light at 0 degrees polarization.
Figure 12:
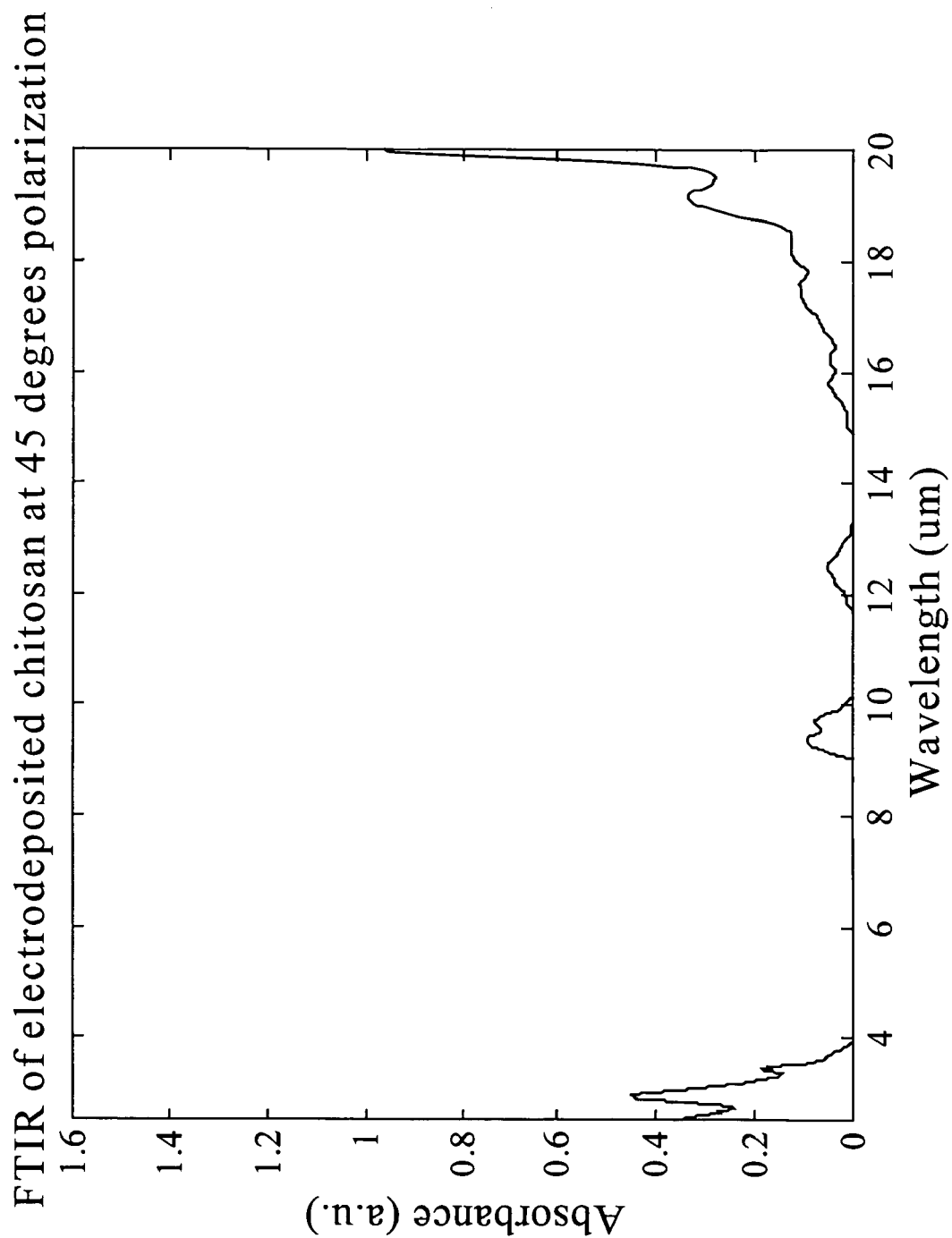
FIG. 12 is an FTIR spectrum of electrodeposited chitosan using light at 45 degrees polarization.
Figure 13:
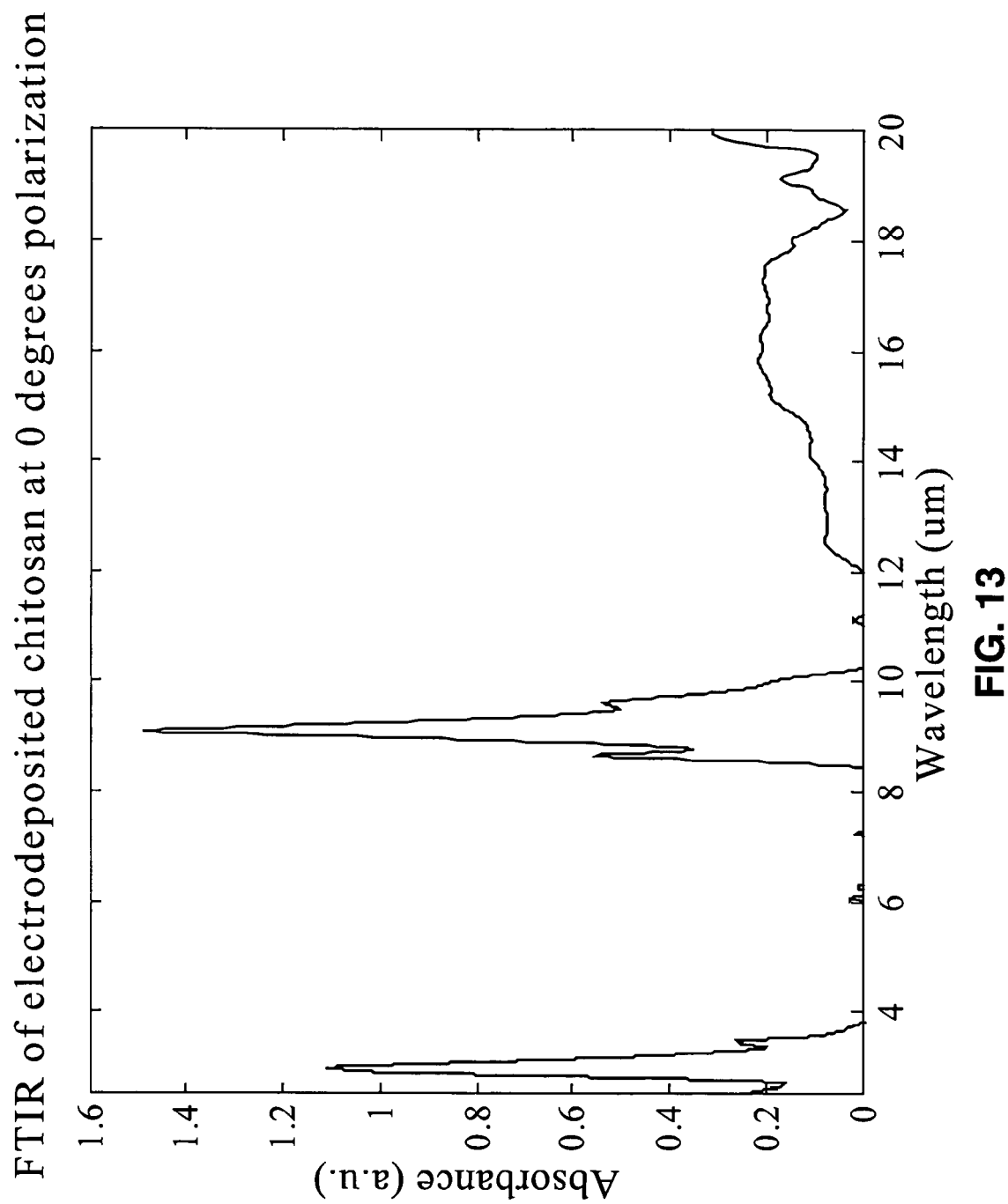
FIG. 13 is an FTIR spectrum of electrodeposited chitosan using light at 90 degrees polarization.

Chitosan is not an isotropic material. Therefore, the orientation of the chitosan molecule chains may have an effect on the IR response. The effect of chain orientation of electrodeposited chitosan on the IR response of films has been studied as well. FTIR spectra were taken of electrodeposited chitosan using a polarized light source. FIGS. 11, 12, and 13 are FTIR spectra using polarized light at 0, 45, and 90 degrees, respectively. Comparison of the spectra indicates that the ratio of absorption of IR at 3 μm to 9 μm is dependent on the polarization of the incident IR.

EXAMPLE

Compatibility of Photolithography with Chitosan

We have investigated the compatibility of chitosan with traditional photolithographic patterning processes. Because both photoresist and chitosan are organic compounds, and chitosan has not been used previously in a semiconductor fabrication process, it was unclear at the outset whether there would be deleterious chemical reactions that would prevent the layering and exposure processes necessary for photolithographic development.

Figure 14:
FIG. 14 is an SEM image of a cross section of photoresist on top of a layer of spin-cast chitosan on a silicon substrate.

A layer of chitosan was deposited via spin-casting, followed by solvent evaporation at 80° C. on a hot plate, following the process previously described. Next a layer of photoresist was deposited via spin-coating at 5,000 rpm for 60 seconds. FIG. 14 is an SEM image of a cross section that shows the discrete nature of the layers, indicating that the two organics do not interact and thus can be kept separate during the photolithography process.

For a positive resist photolithographic process, the wafer is coated with OCG 825 G-line photoresist or OiR 10i (I-line) photoresist. SU8 may be used for a negative resist. A positive resist produces a feature that matches the dark patterns of the mask, while a negative resist produces features that match the light patterns of the mask.

Photoresist is deposited onto a chitosan containing wafer using an SVG 8626 photoresist coat track. The Karl Suss MA6 mask aligner is used for ultraviolet exposure of the photoresist.

Figure 15D:
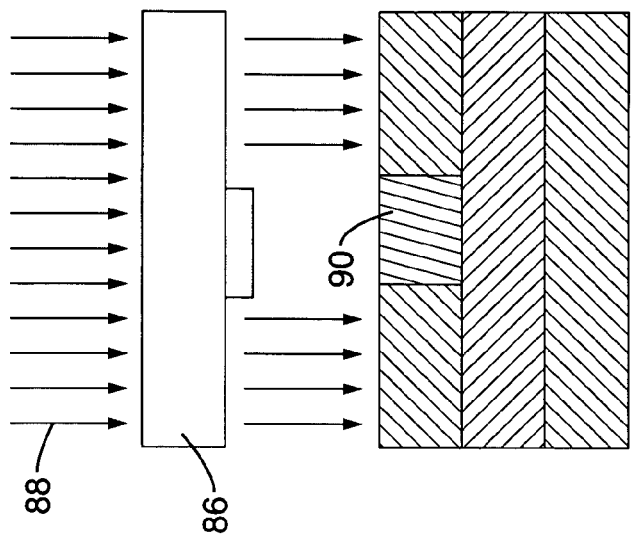
FIGS. 15A-15G show the steps of an embodiment of the photoresist process using chitosan.
Figure 15A:
Figure 15B:
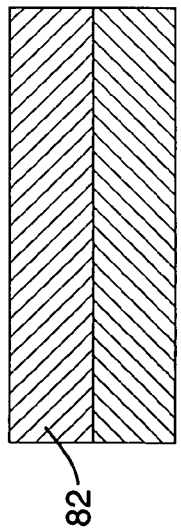
Figure 15C:
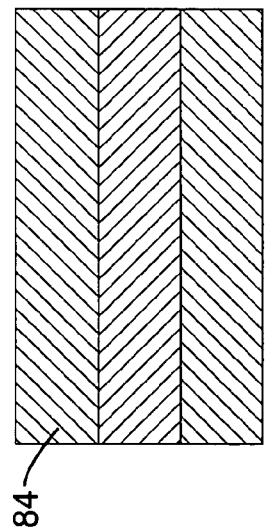
Figure 15E:
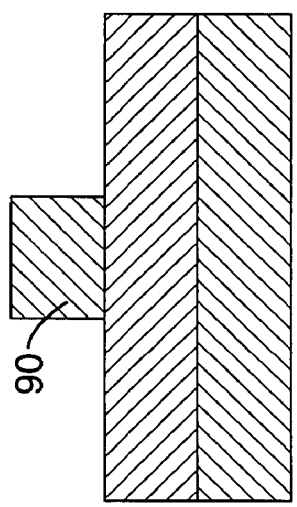
Figure 15F:
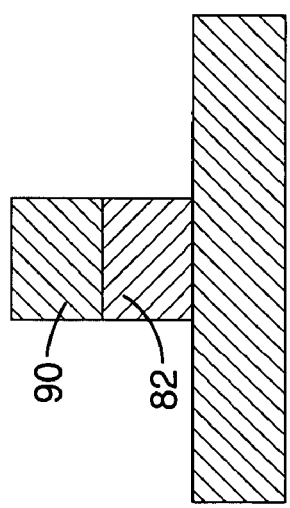

The photolithography process requires a variety of steps, the most important of which is spatially selective, layer-by-layer removal of material. The start of an embodiment of the photolithography process is shown in FIG. 15A, with a bare silicon wafer 80. A spin-coated chitosan layer 82 is deposited on the silicon wafer 80 (FIG. 15B). A spin-coated positive photoresist layer 84 is deposited on the chitosan layer 82 (FIG. 15C). A photomask 86 is applied, and the assembly is subjected to ultraviolet (UV) radiation 88 (FIG. 15D). A portion 90 of the photoresist layer 84 is blocked from the UV radiation 88 by the photomask 86 (FIG. 15E). The chitosan layer 82 is then etched (FIG. 15F), and the remaining photoresist layer 84 is then stripped (FIG. 15G).

Figure 15G:
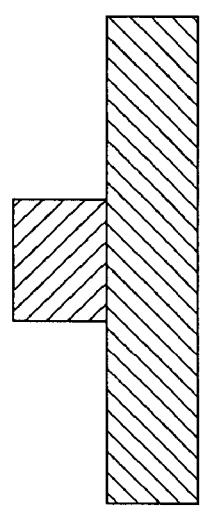

The three removal steps that are required during the photolithographic patterning of chitosan are photoresist development (FIG. 15E), chitosan etching (FIG. 15F), and the photoresist strip (FIG. 15G). Photoresist development is performed using an SVG photoresist development track. Because chitosan is chemically resistant, it is inherently difficult to etch. However, because chitosan is soluble in dilute acidic solutions, we determined that highly concentrated acetic acid may be used as an etchant. Also, timed anisotropic oxygen plasma etching can also be used to etch the chitosan. The final step in pattern transfer is the photoresist stripping.

Postprocessing

Because chitin is insoluble in most commonly available solvents, it is advantageous to form solutions of the more processing-friendly chitosan for thin-film deposition, and then acetylate the chitosan back to chitin. Chitosan is soluble in acidic solutions. Acetic acid is the most commonly used solvent as it is commonly available and is not a harsh treatment. The use of chitin rather than chitosan may be advantageous because it: 1) is the naturally occurring polysacchande found in the jewel beetle, 2) possesses increased thermal stability, and 3) has increased strength. Chitosan films may be converted to chitin films by N-acetylation, using 5% v/v acetic anhydride in methanol. 10 mL of acetic anhydridel-methanol solution is used for every 12.9 mg of chitosan fibers. To prevent O-acetylation, 1 M NaOH was applied. Following acetylation, the wafer is rinsed using deionized water.

Preferred Embodiments of PTFT

Figure 16B:
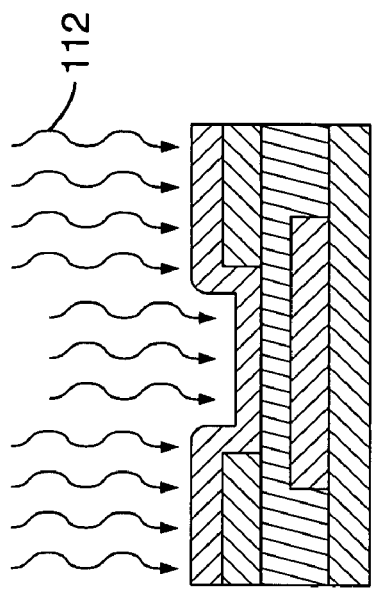
FIGS. 16A-16C show an embodiment of a strain sensor according to the present invention and its behavior when exposed to infrared radiation.
Figure 16C:
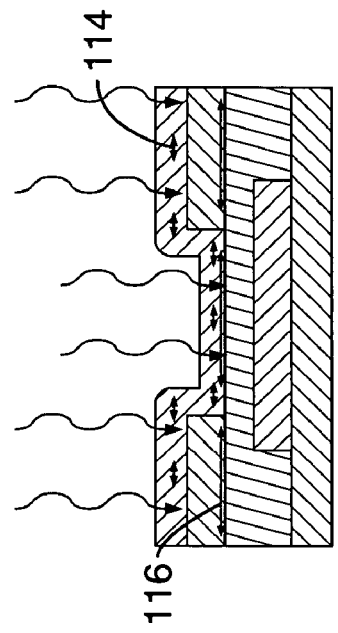
Figure 16A:
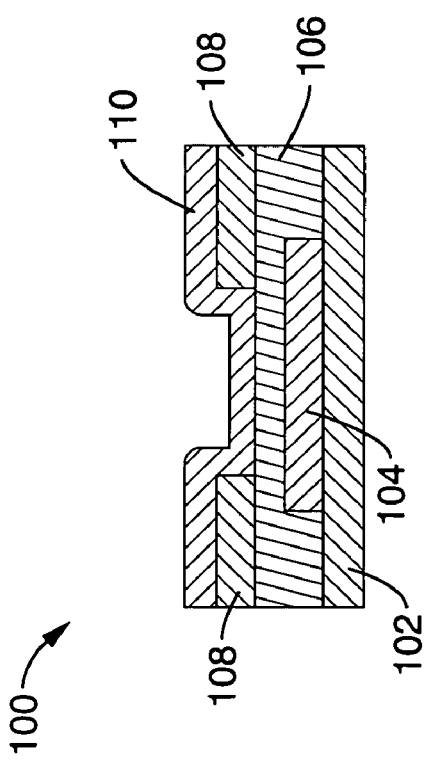

Referring to FIG. 16A, a strain sensor 100 is shown, having a substrate 102, gate 104, dielectric layer 106, source/drain 108, and photomechanical polymer layer 110. The sensor 100 is then exposed to infrared radiation (IR rays) 112 (FIG. 16B). The IR rays 112 cause expansion 114 in the photomechanical polymer layer 110, due to bond stretching. This expansion appears as strain 116 between the photomechanical polymer layer 110 and the dielectric layer 106 (FIG. 16C).

Referring to FIG. 17A, a strain sensor 120 is shown having a substrate 122, gate 124, a photomechanical polymer layer 126, source/drain 128, and semiconductor layer 130. The sensor 120 is then exposed to infrared radiation (IR rays) 132 (FIG. 17B). In this embodiment, the semiconductor layer 130 and source/drain 128 are transparent to IR. The IR rays 132 cause expansion 134 in the photomechanical polymer layer 126, due to bond stretching.

Figure 18B:
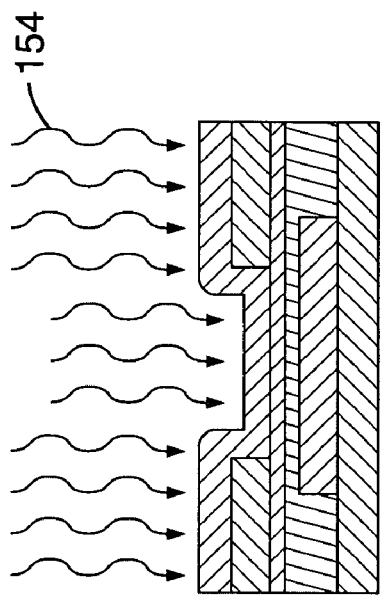
FIGS. 18A-18C show an embodiment of a strain sensor according to the present invention and its behavior when exposed to infrared radiation.
Figure 18A:
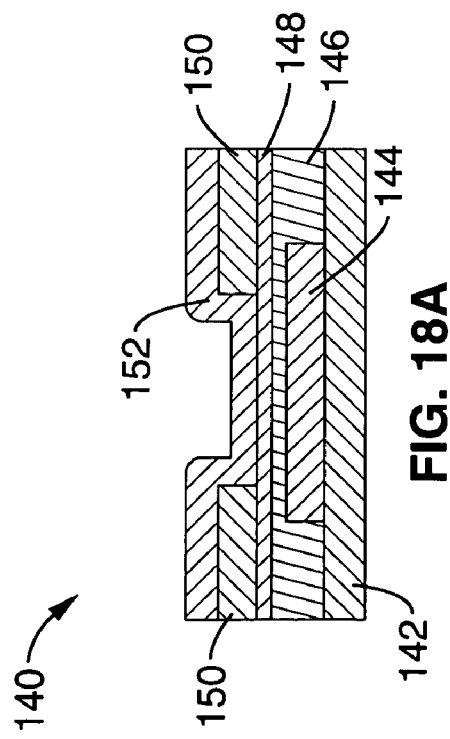
Figure 18C:
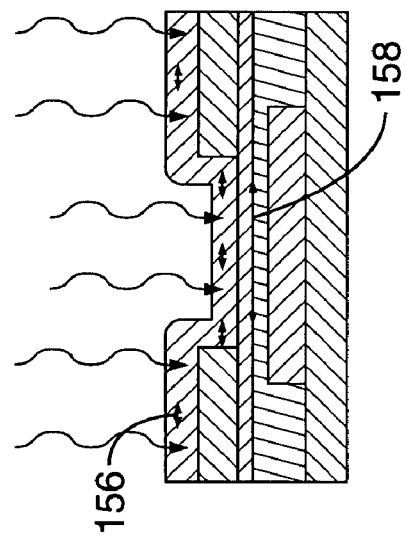

Referring to FIG. 18A, a strain sensor 140 is shown, having a substrate 142, gate 144, dielectric layer 146, active layer 148, source/drain 150, and photomechanical polymer layer 152. The sensor 140 is then exposed to infrared radiation (IR rays) 154 (FIG. 17B). The IR rays 154 cause expansion 156 in the photomechanical polymer layer 152, due to bond stretching. This expansion appears as strain 158 between the active layer 148 and the dielectric layer 146 (FIG. 17C).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Comparison of performance characteristics of IR detector in *Melanophila acuminata* to existing photon and thermal detectors.

| Property | Photon Detector | Thermal Detector | Biomimetic Detector |
| --- | --- | --- | --- |
| Spectral Sensitivity | Narrow band | Broadband | Narrow band |
| Response Time | Fast (μs) | Slow (10 ms) | Moderate (4 ms) |
| Cooling | Mandatory | Unnecessary | Unnecessary |
| Cost | High | Low | Low |

What is claimed is:

1. An infrared sensor, comprising:
a photomechanical thin film transistor (PTFT);
wherein said PTFT comprises:
a photomechanical polymer layer comprising chitin or chitin derivatives;
wherein said photomechanical polymer layer is sensitive to infrared radiation.

2. An infrared sensor as recited in claim 1, wherein said photomechanical polymer layer is located on top of said PTFT.

3. An infrared sensor as recited in claim 1:
wherein said PTFT further comprises:
a semiconductor layer;
wherein said semiconductor layer is partially or fully transparent to infrared radiation; and
wherein said photomechanical polymer layer is located below said semiconductor layer.

4. An infrared sensor as recited in claim 1, wherein said photomechanical polymer layer is sensitive to wavelengths emitted by forest fires or humans.

5. An infrared sensor as recited in claim 1, further comprising:
a plurality of photomechanical thin film transistors (PTFTs);
wherein said plurality of PTFTs is oriented in an array; and
wherein each of said PTFTs comprises:
a photomechanical polymer layer comprising chitin or chitin derivatives;
wherein said photomechanical polymer layer is sensitive to infrared radiation.

6. An infrared sensor, comprising:
a thin film transistor;
wherein said thin film transistor comprises:
a gate dielectric;
wherein said gate dielectric comprises a photomechanical polymer.

7. An infrared sensor as recited in claim 6, wherein said polymer comprises chitin or chitin derivatives.

* * * * *